(12) United States Patent
Bacon-Brown

(10) Patent No.: US 11,892,120 B2
(45) Date of Patent: Feb. 6, 2024

(54) LOCK WITH SERVICEABLE KEYPAD

(71) Applicant: dormakaba USA Inc., Indianapolis, IN (US)

(72) Inventor: James David Bacon-Brown, Lexington, KY (US)

(73) Assignee: dormakaba USA Inc., Indianapolis, IN (US)

( * ) Notice: Subject to any disclaimer, the term of this patent is extended or adjusted under 35 U.S.C. 154(b) by 27 days.

(21) Appl. No.: 17/477,262

(22) Filed: Sep. 16, 2021

(65) Prior Publication Data

US 2023/0082773 A1 Mar. 16, 2023

(51) Int. Cl.
*E05B 9/08* (2006.01)
*E05B 49/00* (2006.01)
*F16M 13/02* (2006.01)

(52) U.S. Cl.
CPC ............ *F16M 13/02* (2013.01); *E05B 49/00* (2013.01); *E05B 9/08* (2013.01)

(58) Field of Classification Search
CPC ... E05B 15/02; E05B 9/08; E05B 3/06; E05B 3/065; Y10T 292/91; Y10T 292/0814; Y10T 292/0818
USPC ........................................................ 403/353
See application file for complete search history.

(56) References Cited

U.S. PATENT DOCUMENTS

| | | | | |
|---|---|---|---|---|
| 981,866 A | * | 1/1911 | Lockhart ............... | F16L 37/252 285/361 |
| 2,423,206 A | * | 7/1947 | Schlage .................. | E05B 15/02 292/357 |
| 4,037,865 A | * | 7/1977 | Hook ........................ | E05B 3/06 292/357 |
| 5,409,278 A | * | 4/1995 | Harcourt ................... | E05B 3/06 292/357 |
| 6,598,440 B1 | * | 7/2003 | Armstrong ............ | E05B 55/005 292/336.3 |

(Continued)

FOREIGN PATENT DOCUMENTS

| CN | 108868322 A | * 11/2018 | ............ E05B 9/002 |
|---|---|---|---|
| DE | 401571 C | 9/1924 | |

(Continued)

OTHER PUBLICATIONS

European Patent Office, Communication, Extended European Search Report issued in counterpart EP Application No. 22196021.4, dated Feb. 21, 2023, 4 pages.

*Primary Examiner* — Carlos Lugo
(74) *Attorney, Agent, or Firm* — Norton Rose Fulbright US LLP

(57) ABSTRACT

An attachment system for a locking system mounted to a closure is provided. A baseplate is fastenable to a mounting surface of the closure, the baseplate including at least one circumferential cutout having an engagement feature, and a locking feature on a surface of the baseplate. A housing has at least one protrusion insertable into the at least one circumferential cutout and is rotatably engageable with the engagement feature to selectively prevent the housing from being withdrawn from the baseplate in a direction normal to the mounting surface. A locking device is disposed inside the housing and is accessible from outside the housing through a cutout defined in at least one of the housing and the baseplate, the locking device operable to rotatably lock and unlock the housing to the baseplate.

15 Claims, 36 Drawing Sheets

(56) References Cited

U.S. PATENT DOCUMENTS

| | | | | |
|---|---|---|---|---|
| 6,745,602 | B2 * | 6/2004 | Nakasone | E05B 3/003 |
| | | | | 292/357 |
| 7,168,275 | B2 * | 1/2007 | Fawcett | E05B 67/003 |
| | | | | 70/57.1 |
| 7,918,112 | B2 * | 4/2011 | Fawcett | E05B 73/0052 |
| | | | | 70/57.1 |
| 8,172,284 | B2 * | 5/2012 | Chern | E05B 3/06 |
| | | | | 292/336.3 |
| 9,394,727 | B2 * | 7/2016 | Fawcett | E05B 45/005 |
| 10,920,450 | B2 * | 2/2021 | Horiuchi | E05B 3/065 |
| 2019/0211580 | A1 | 7/2019 | Horiuchi | |

FOREIGN PATENT DOCUMENTS

| | | | | |
|---|---|---|---|---|
| DE | 628361 | C * | 4/1936 | |
| DE | 29901772 | U1 * | 6/1999 | E05B 15/02 |
| DE | 102006006957 | A1 | 8/2007 | |
| DE | 202011000933 | U1 * | 9/2011 | E05B 15/02 |
| EP | 2840203 | A1 | 2/2015 | |

\* cited by examiner

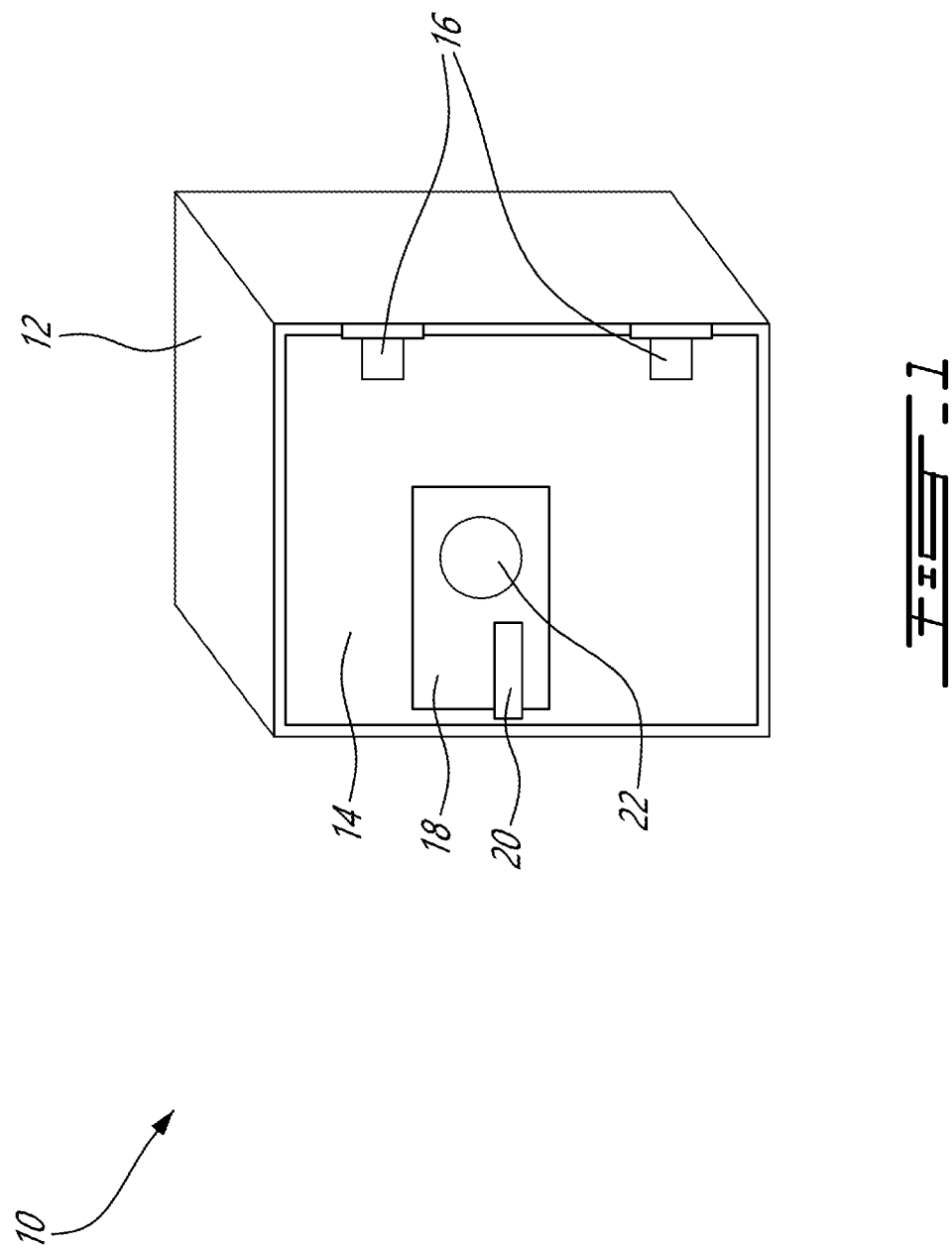

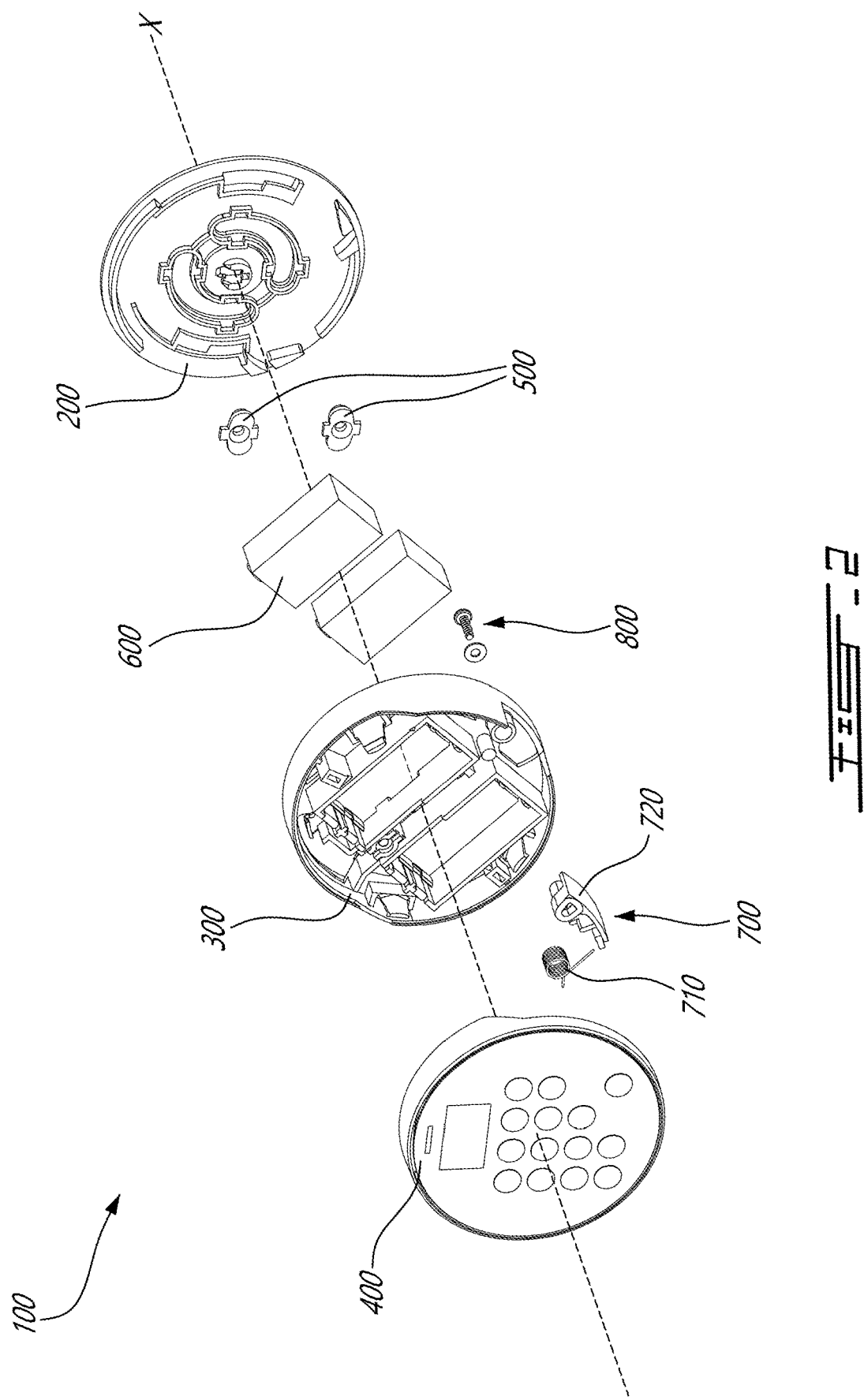

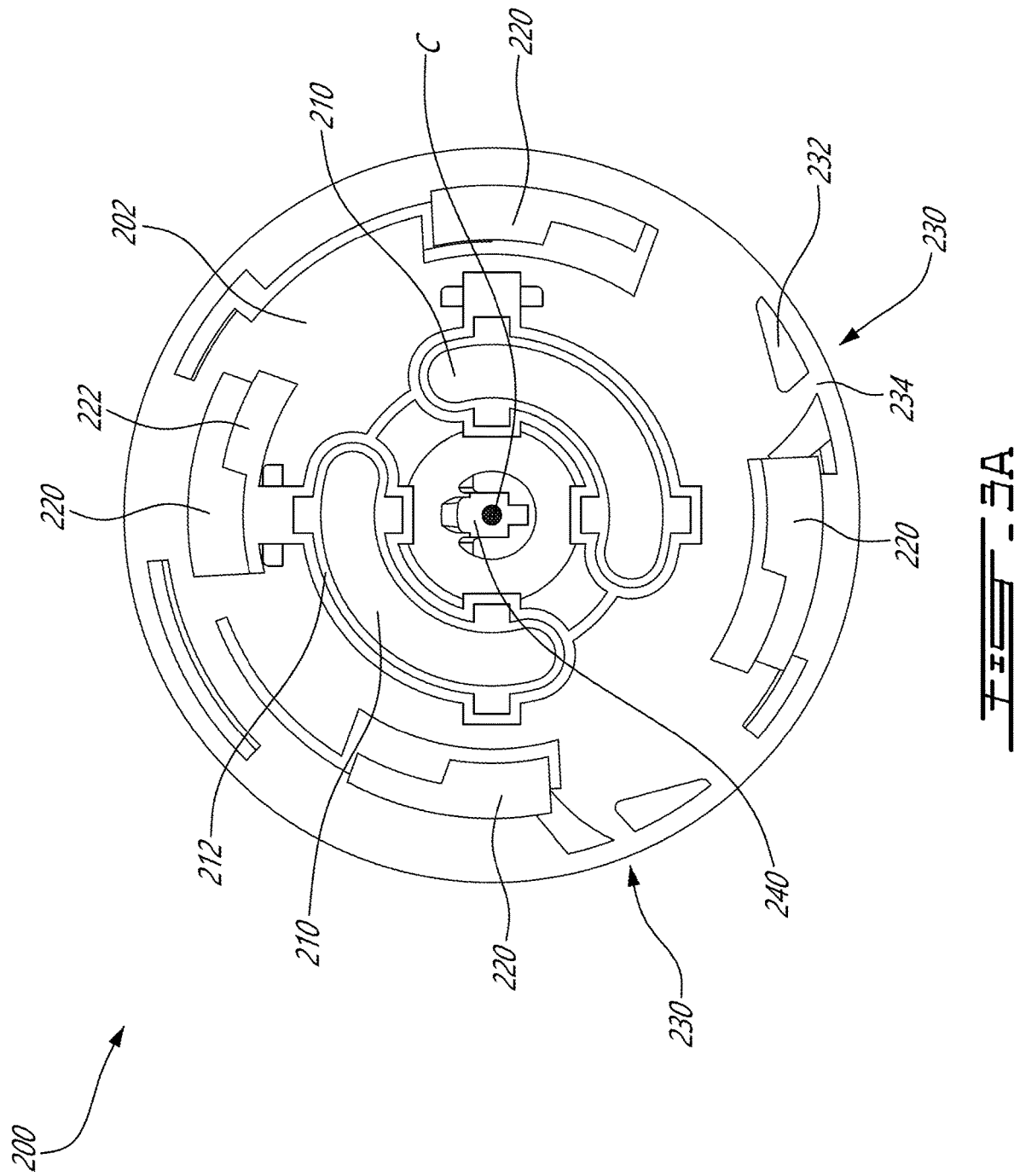

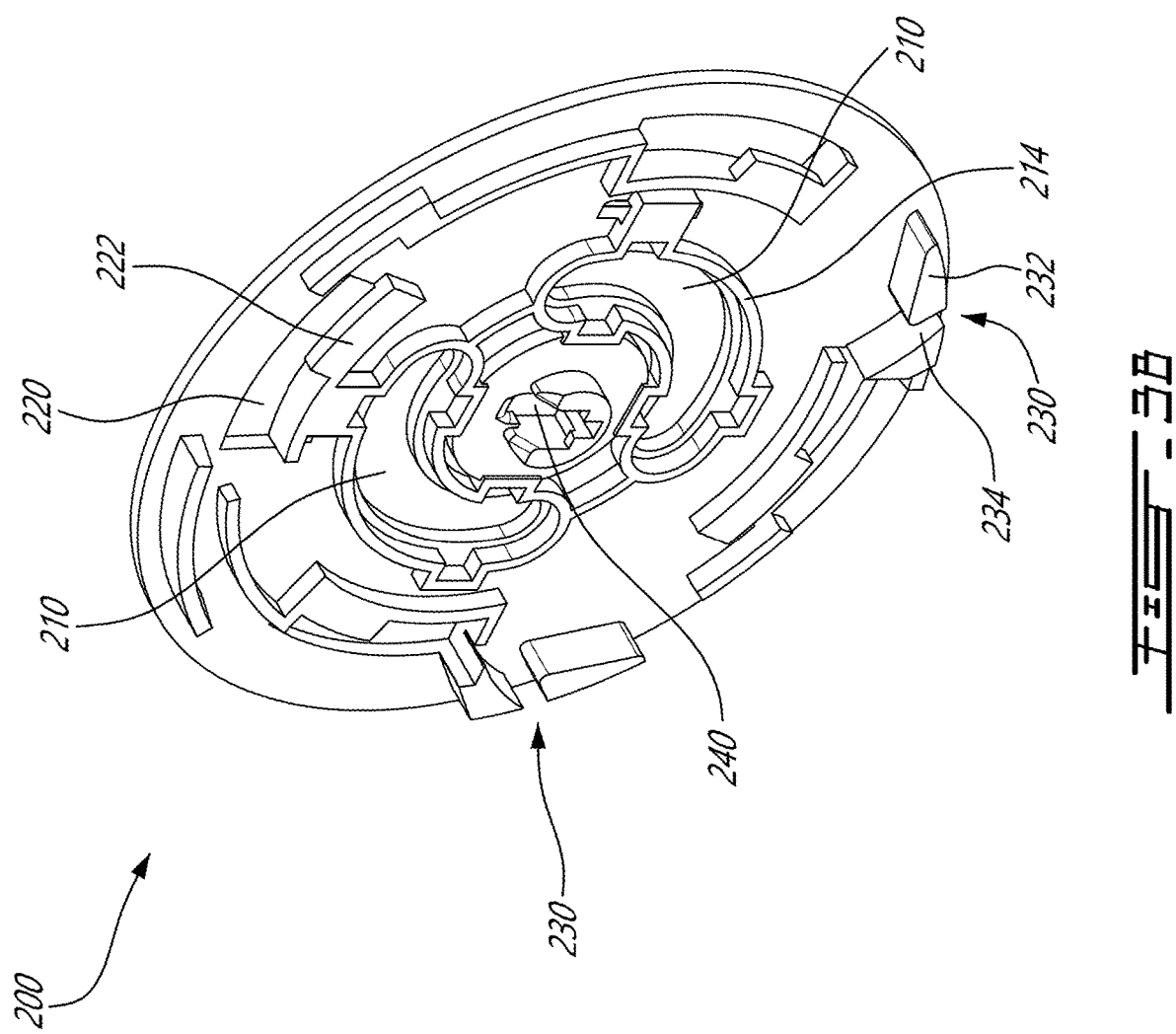

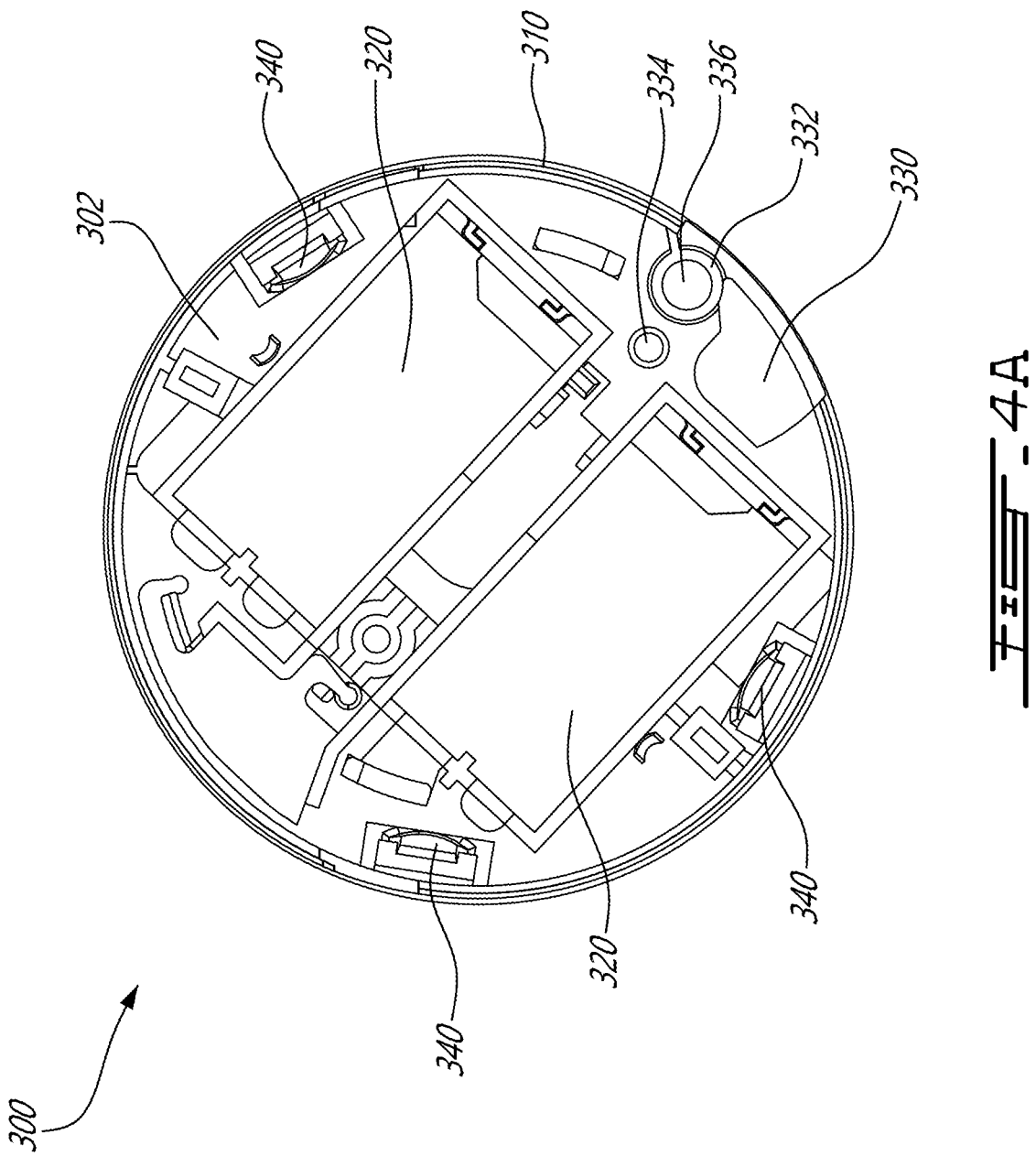

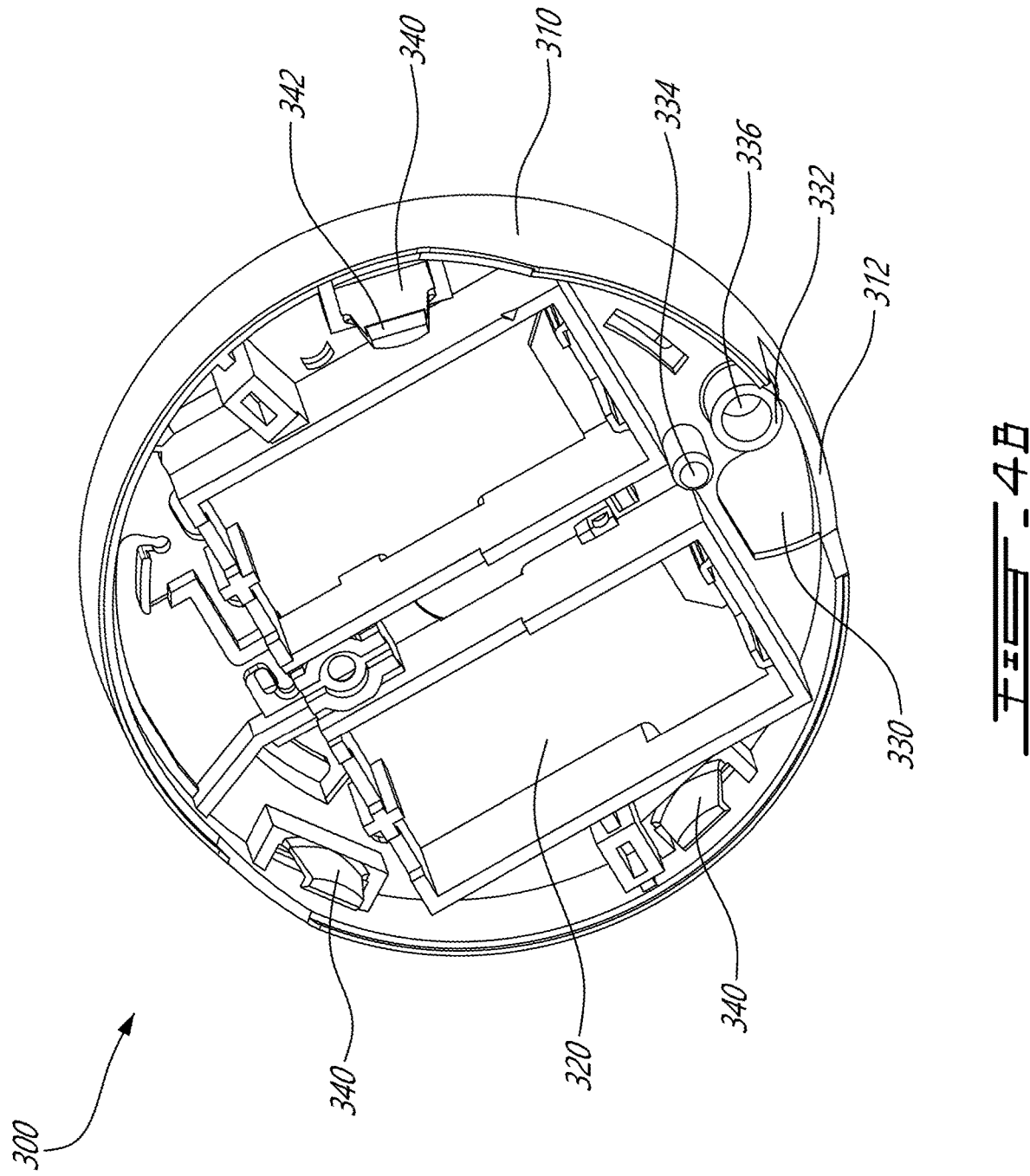

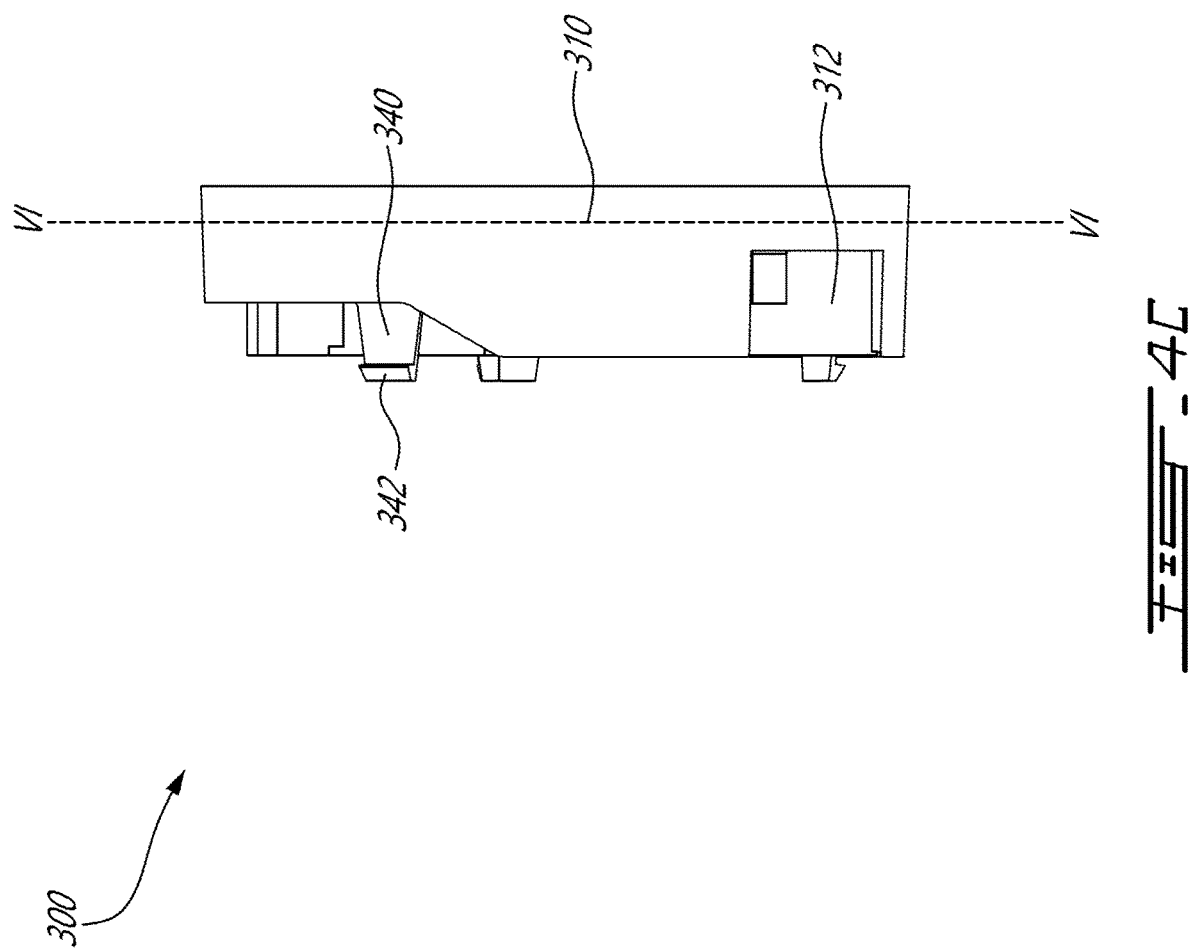

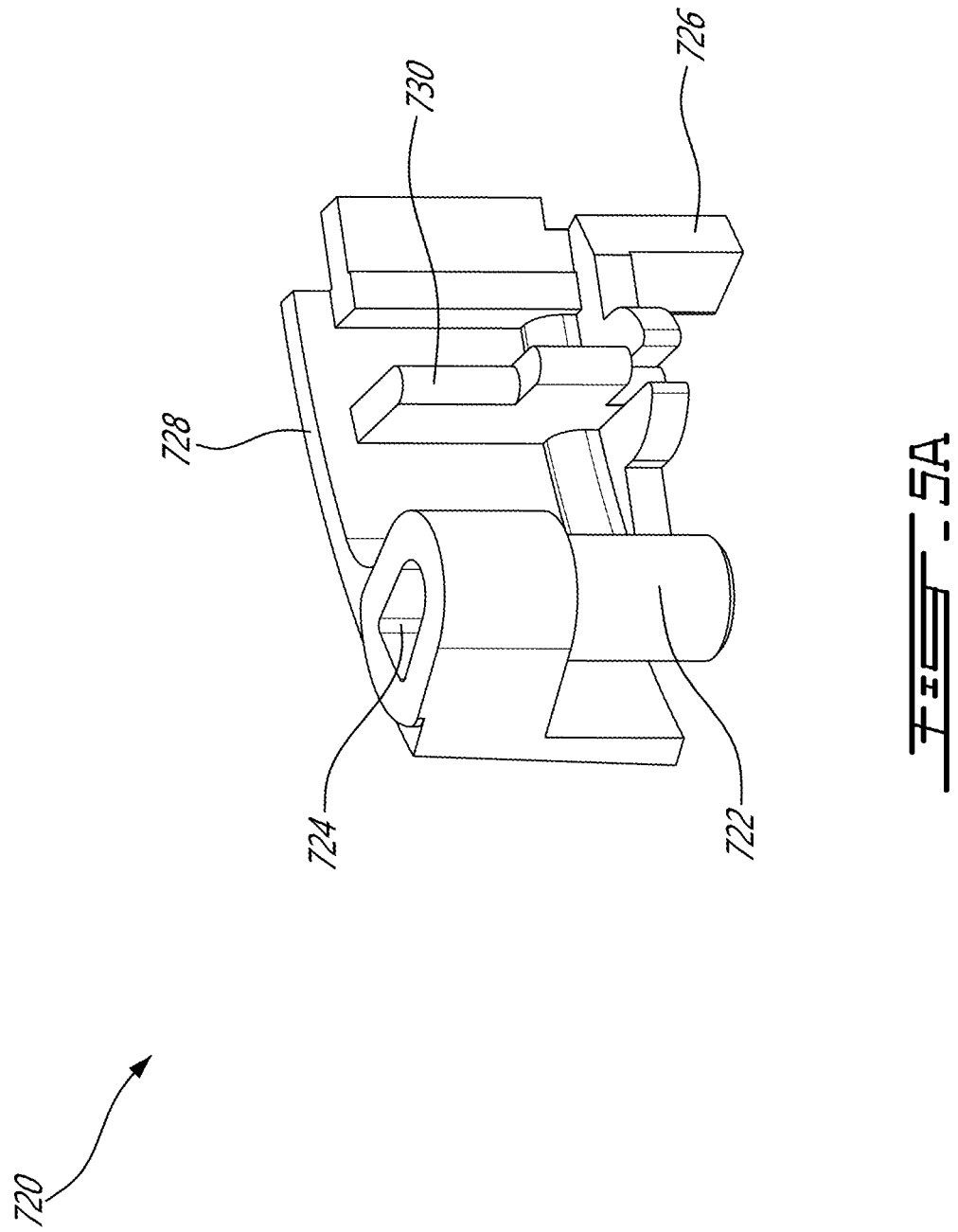

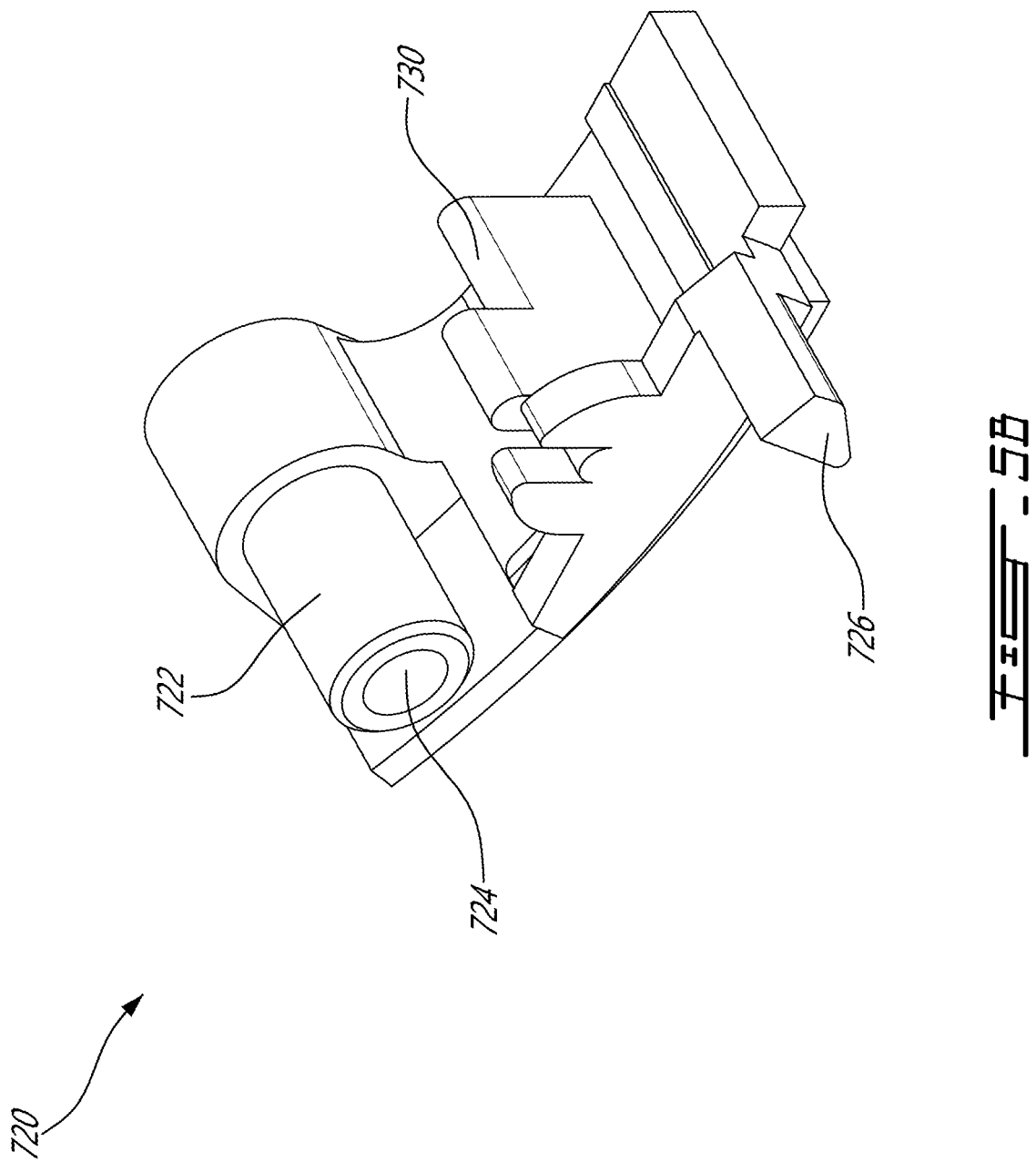

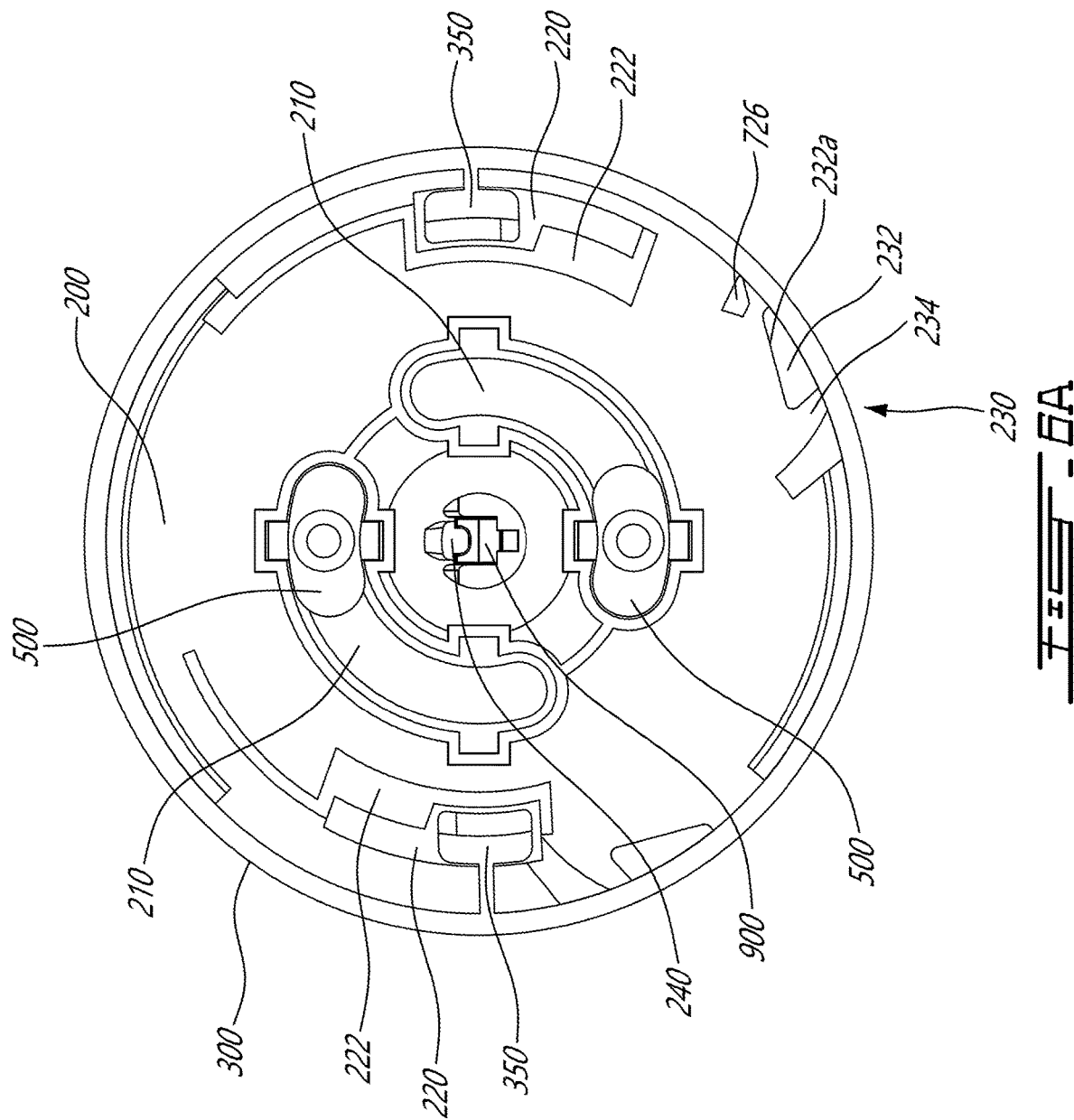

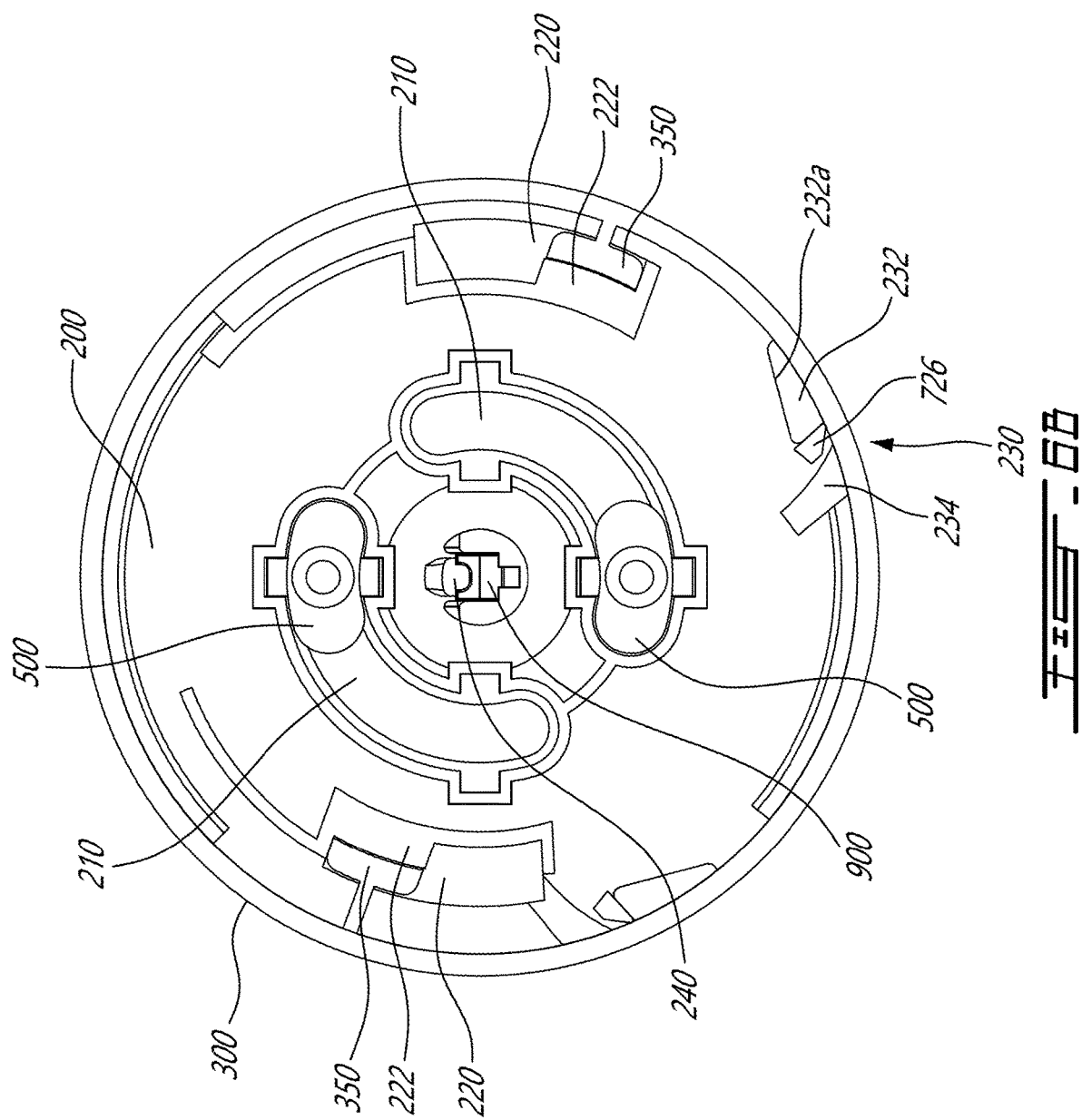

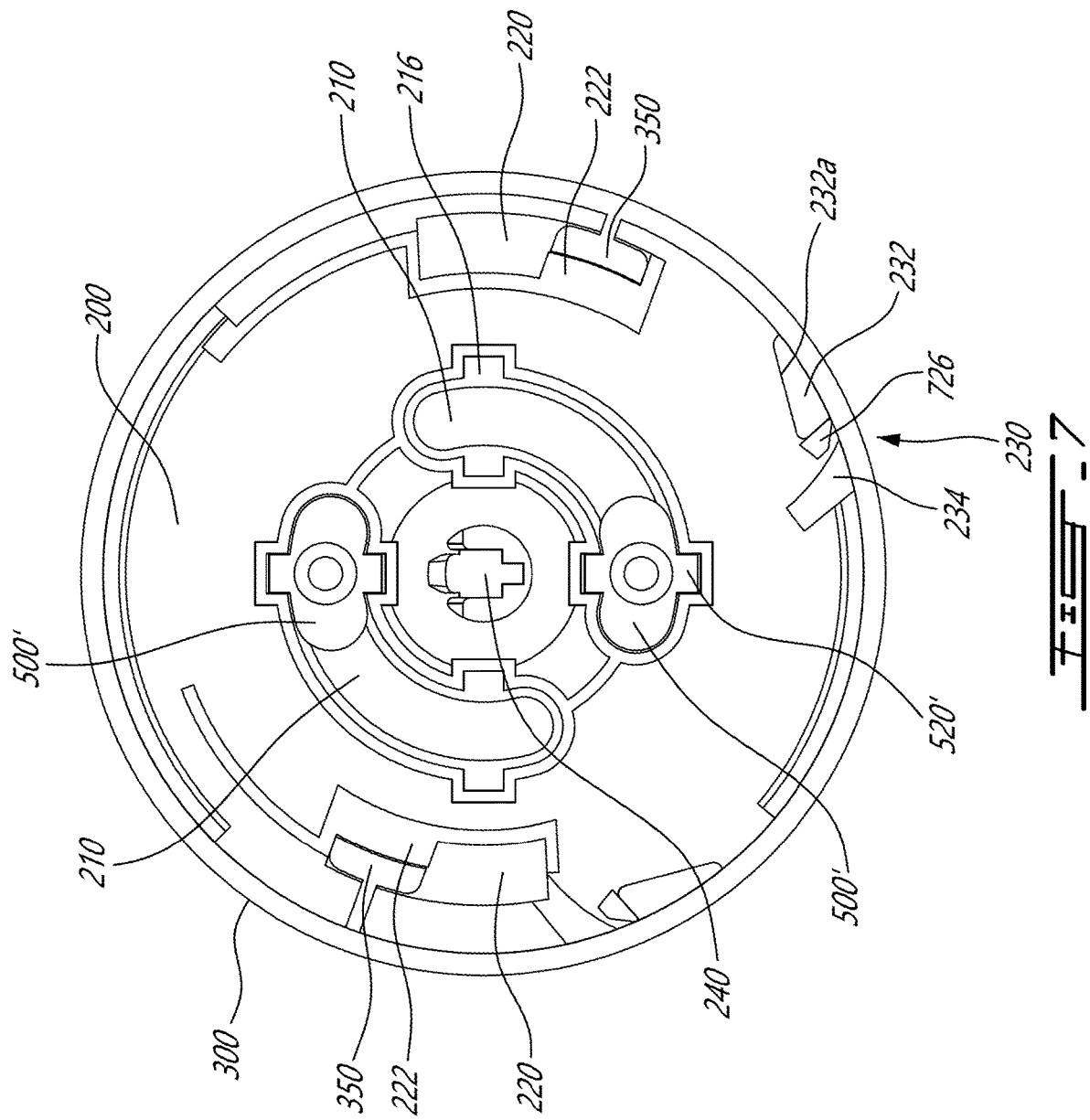

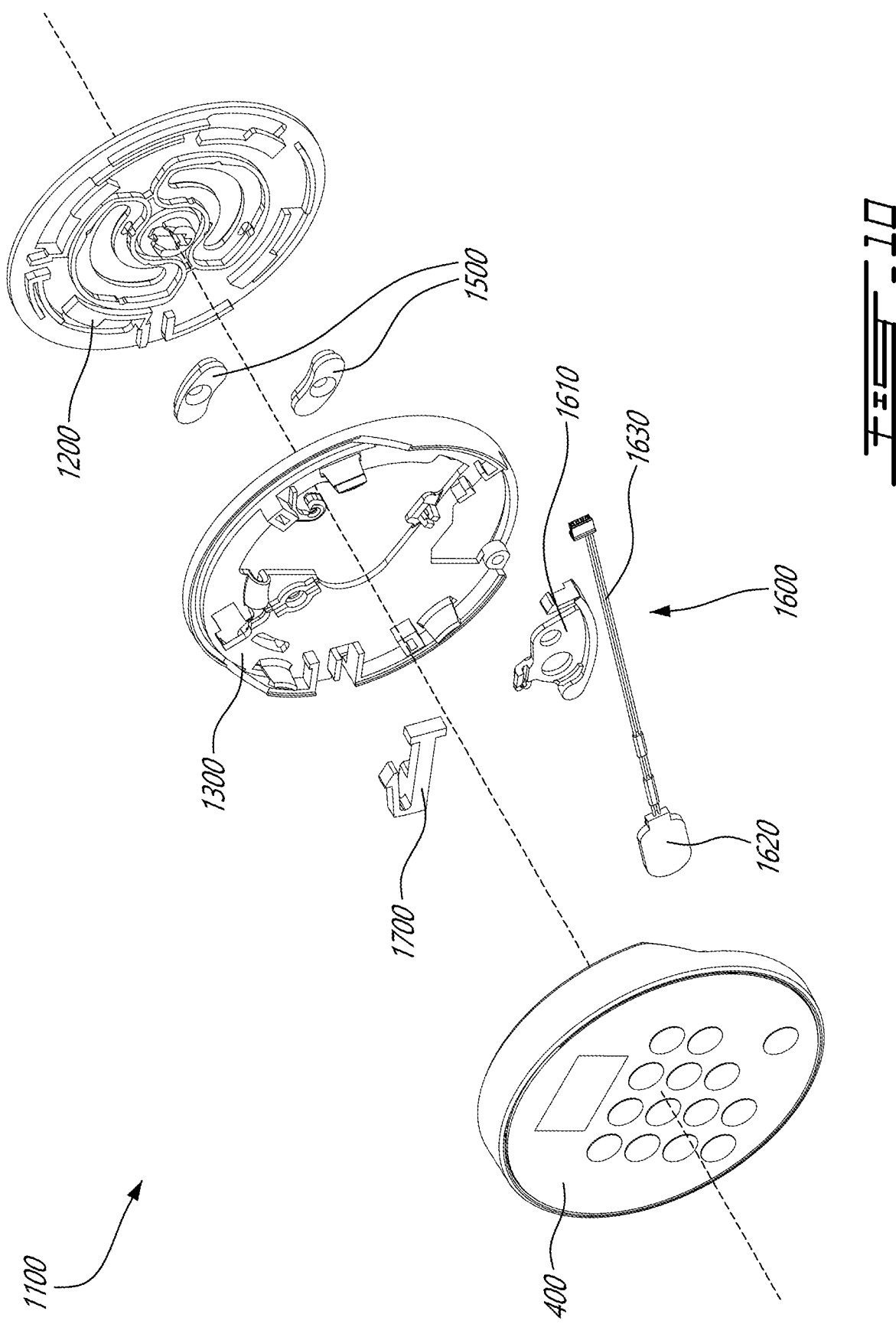

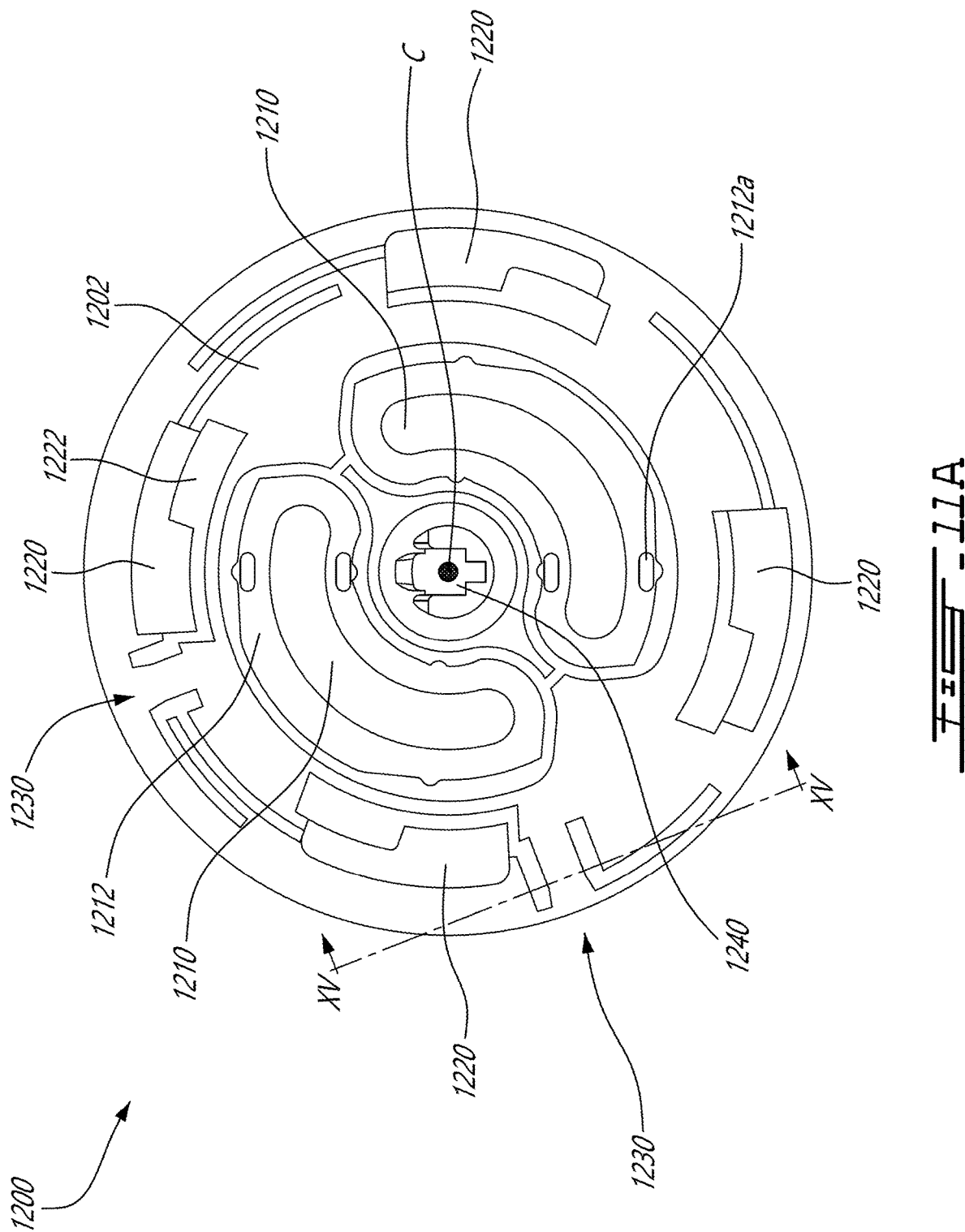

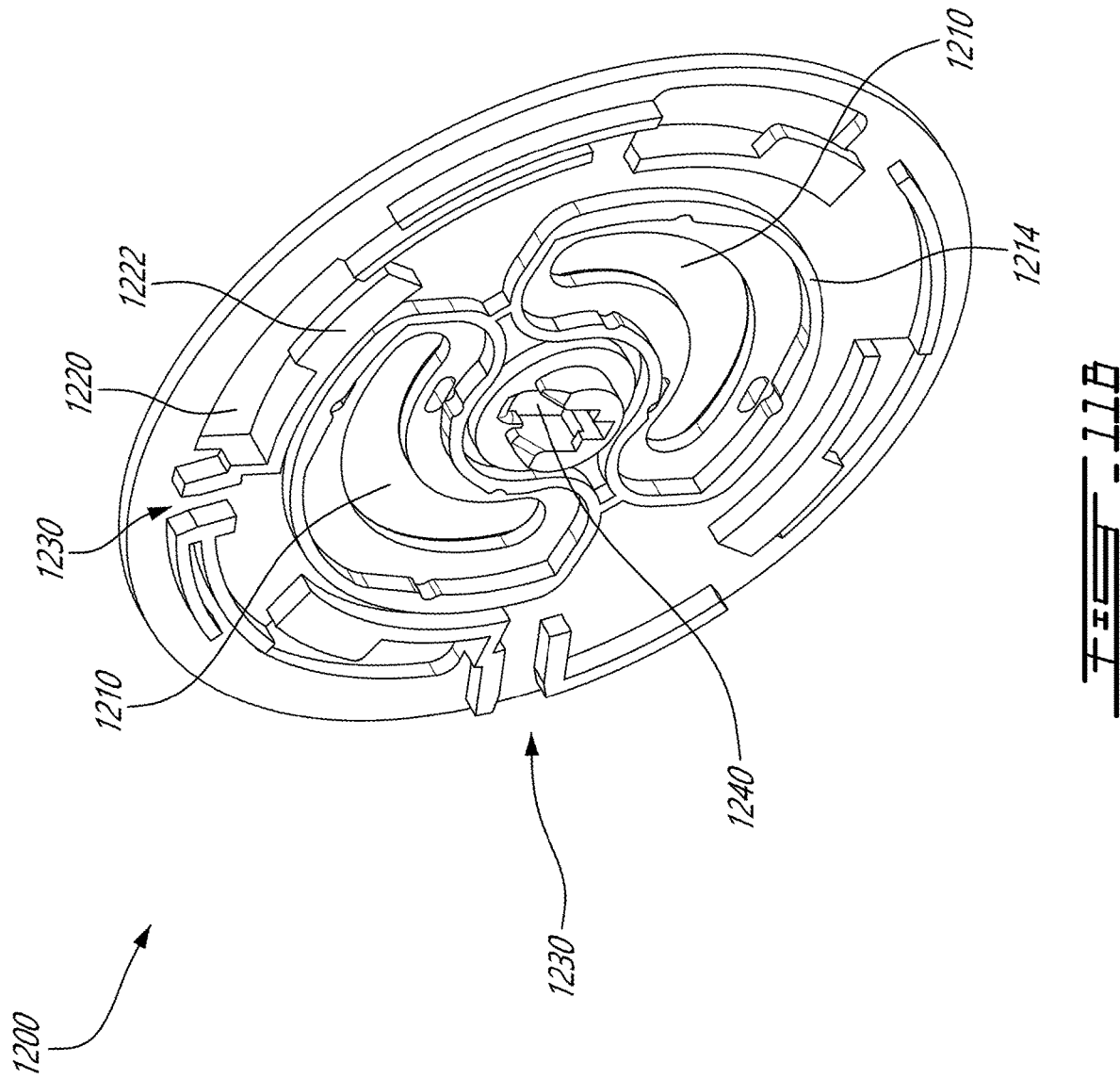

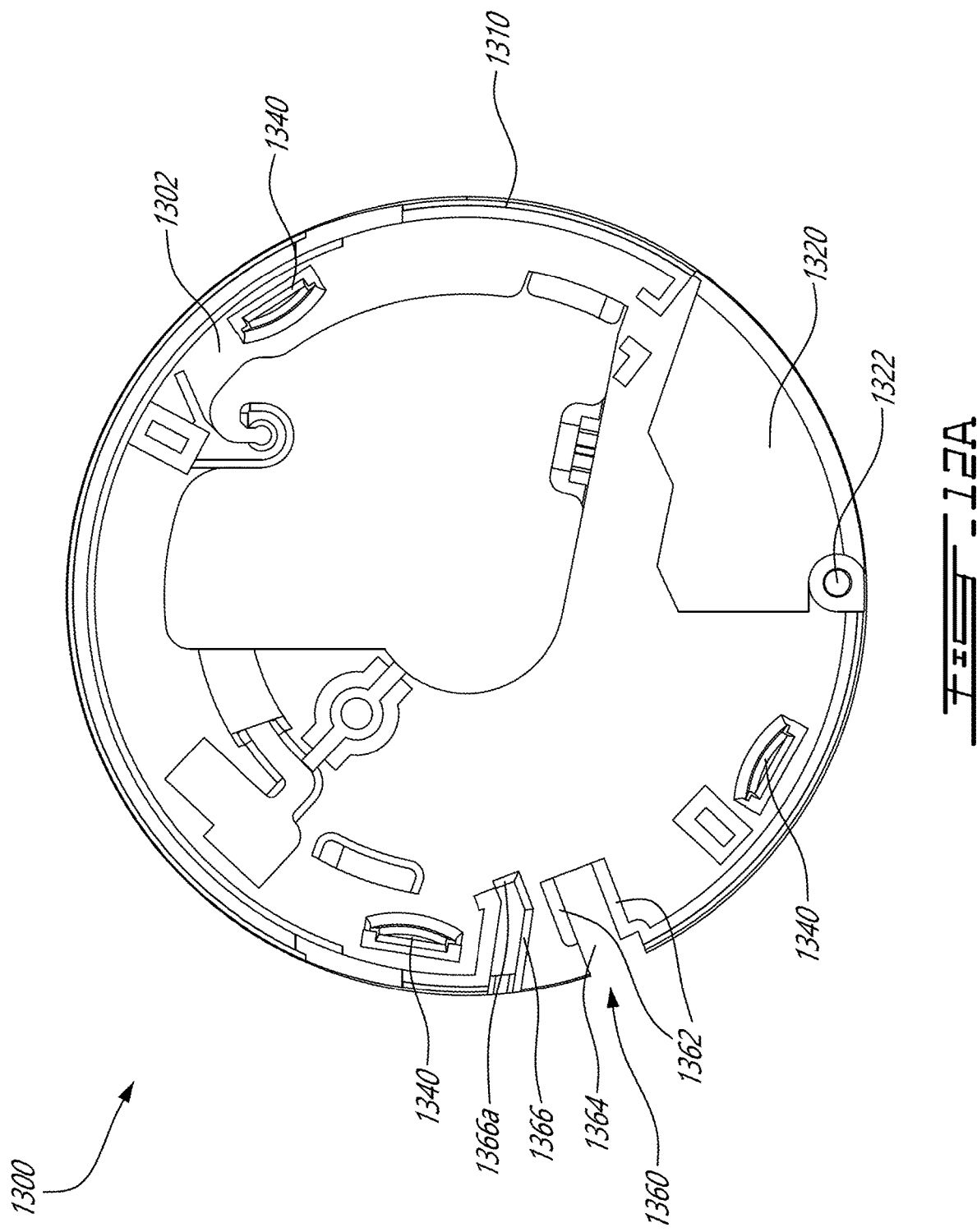

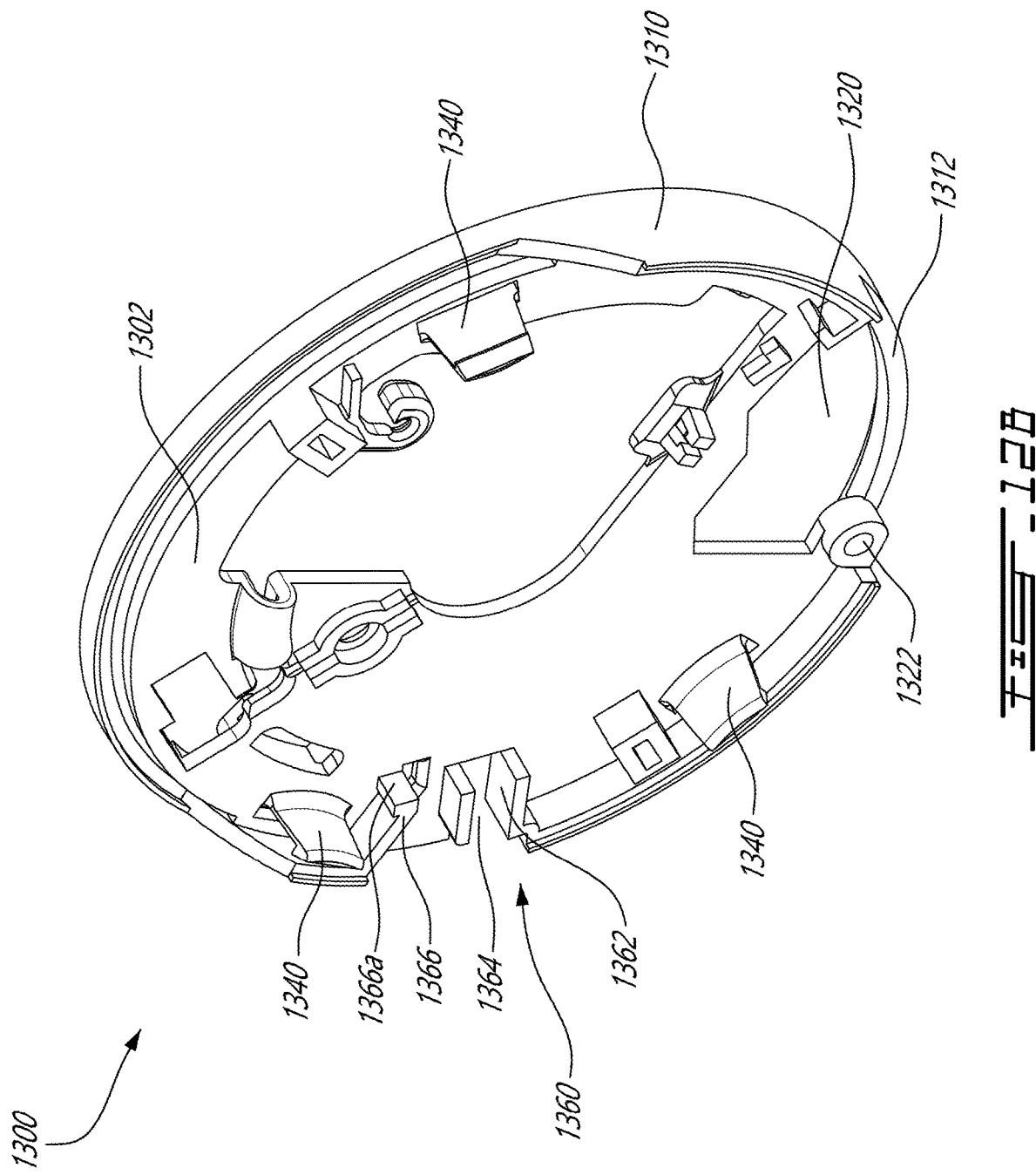

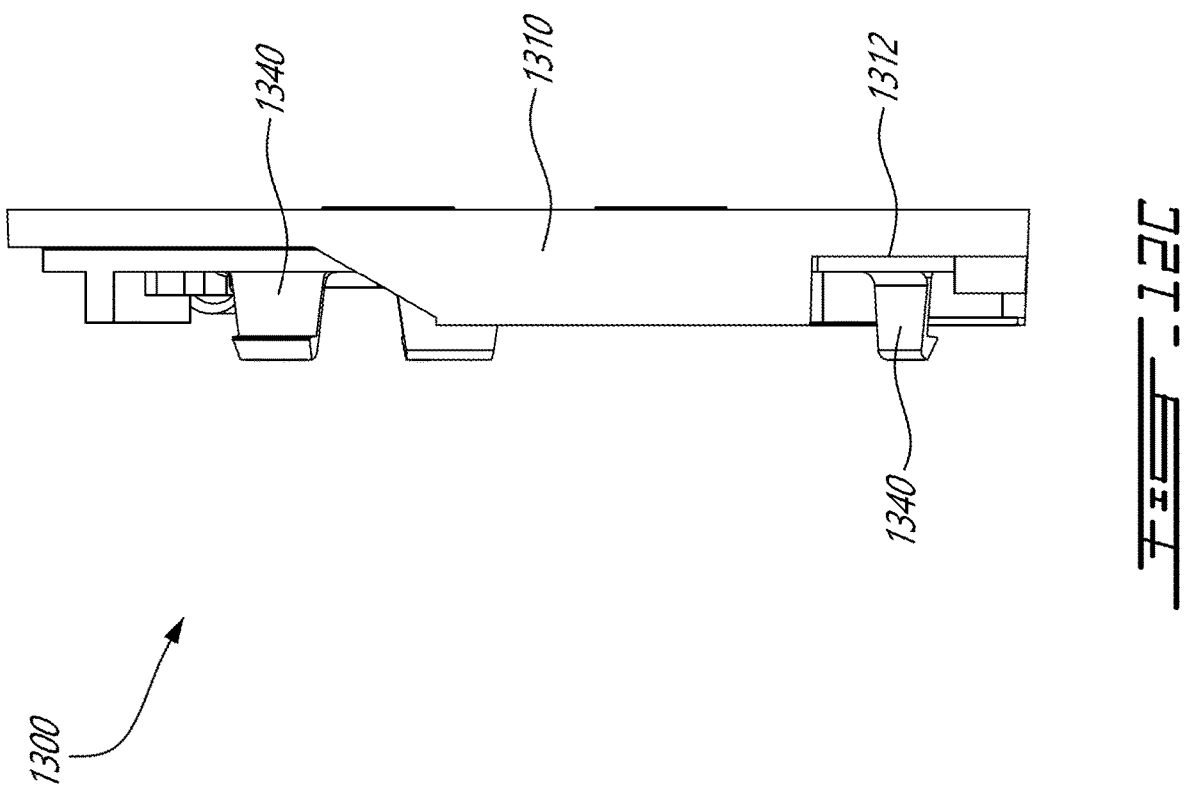

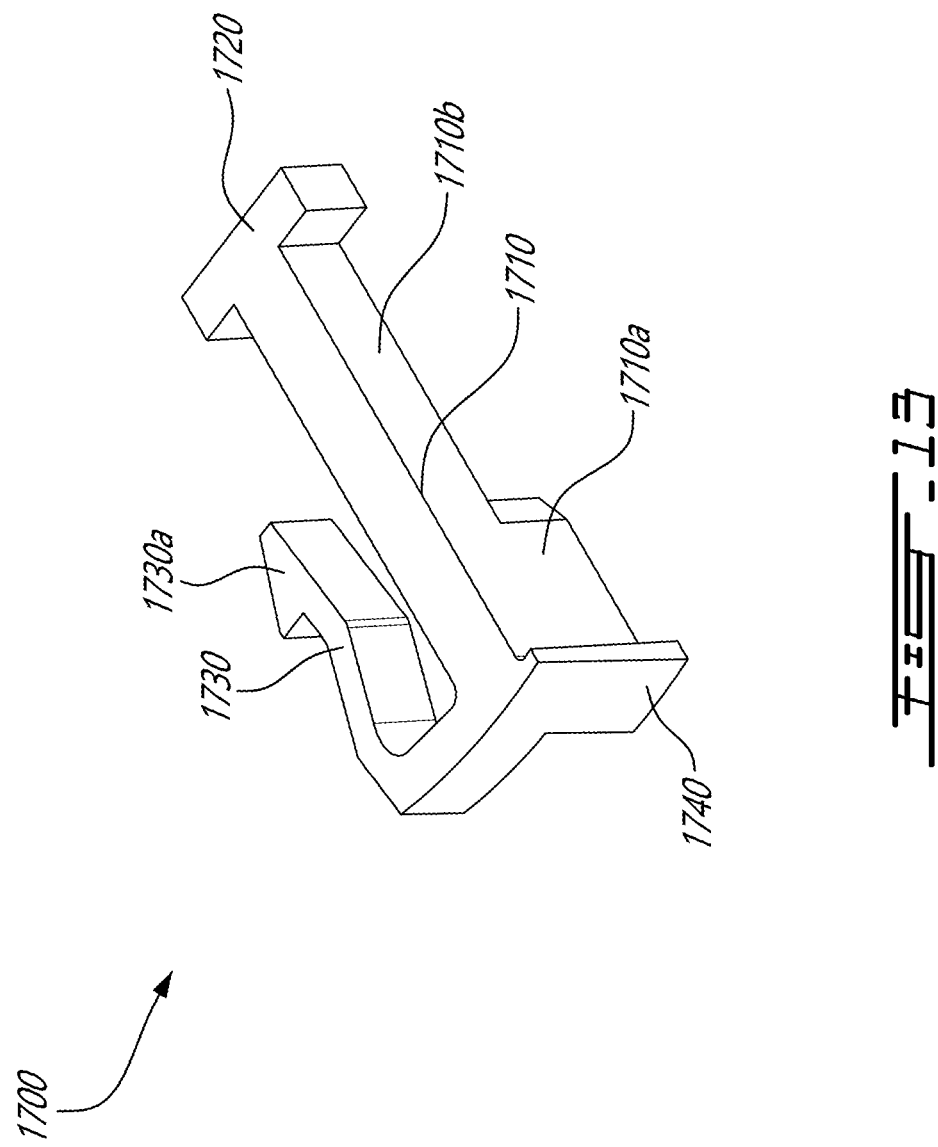

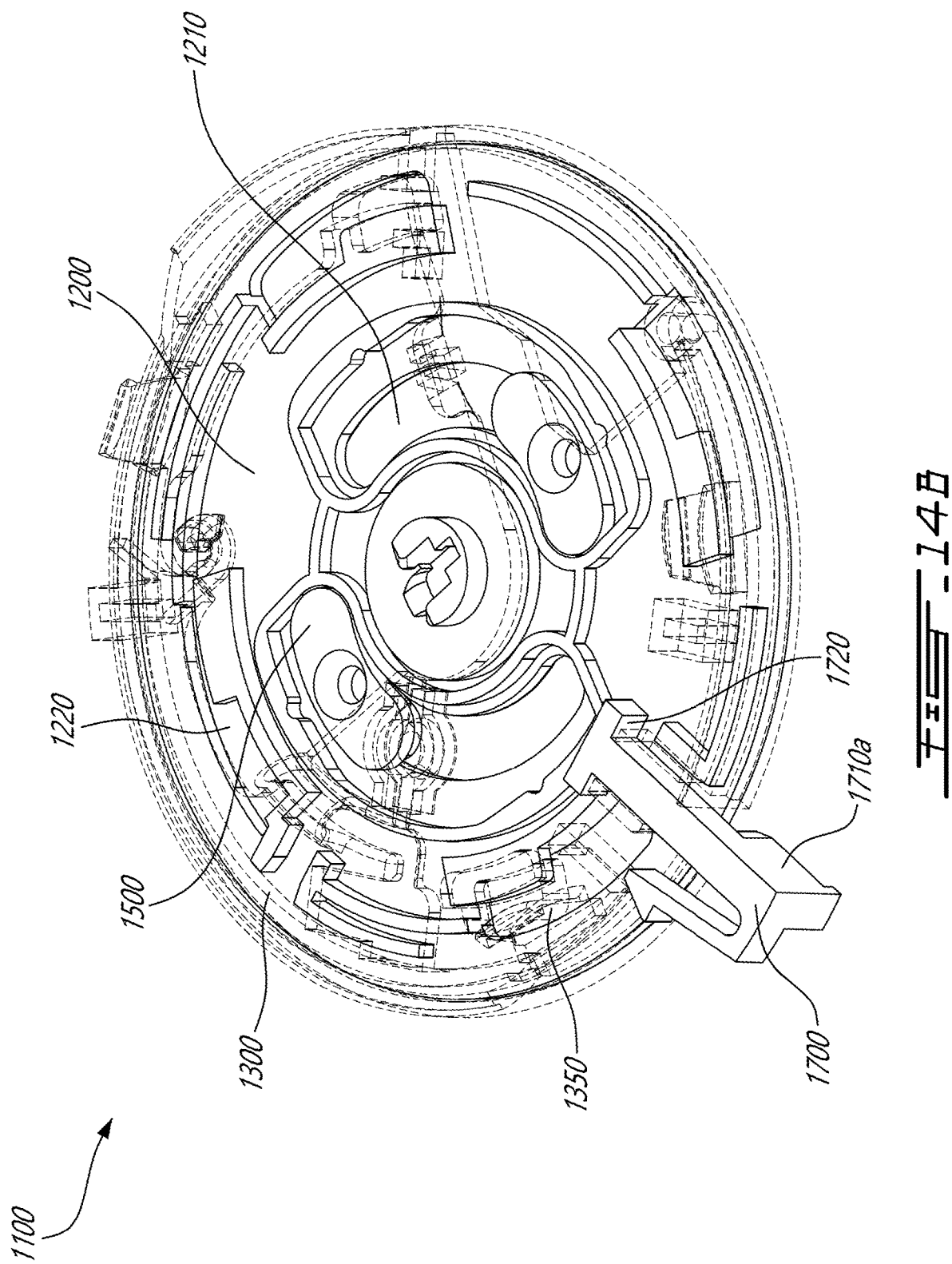

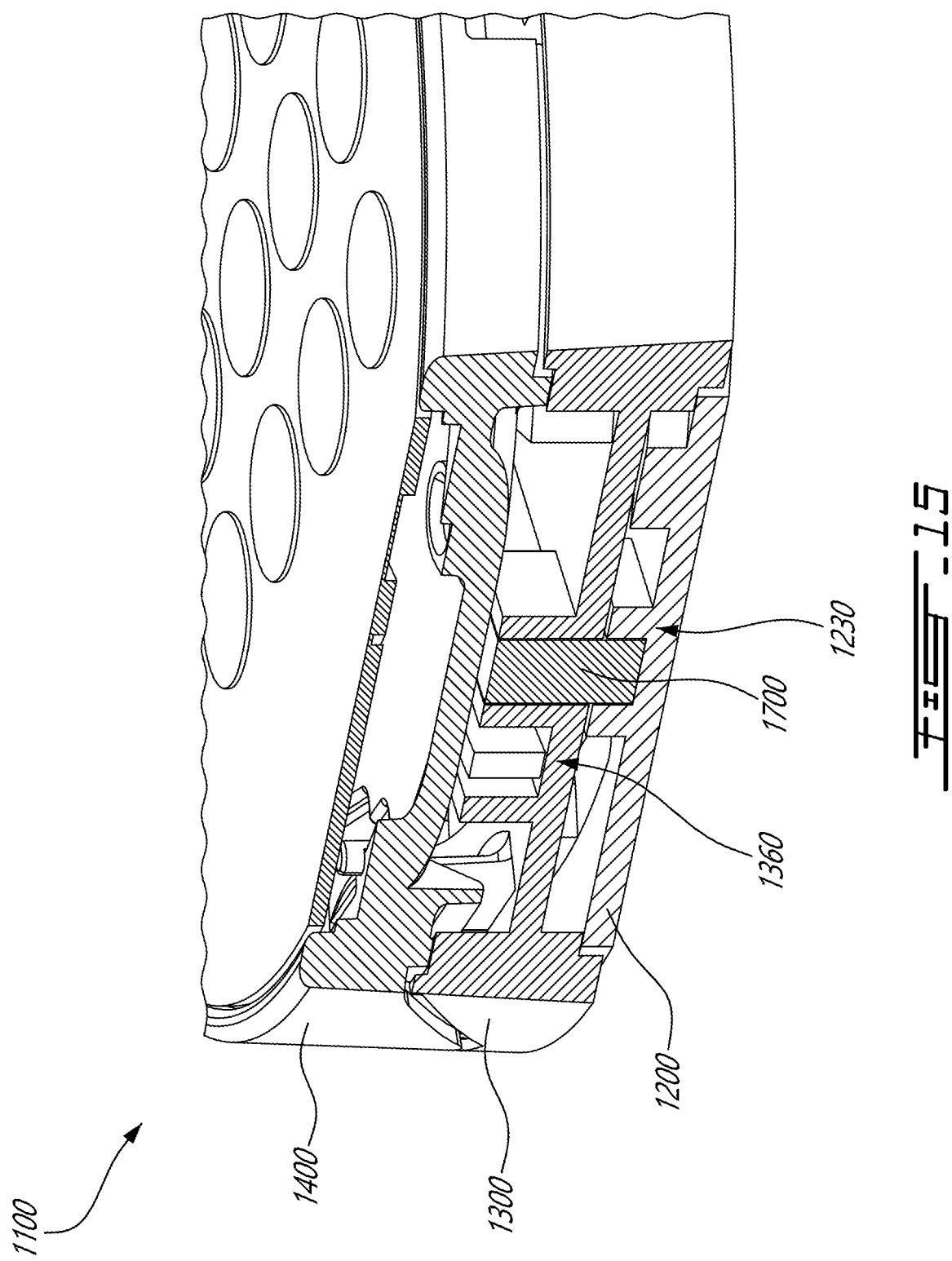

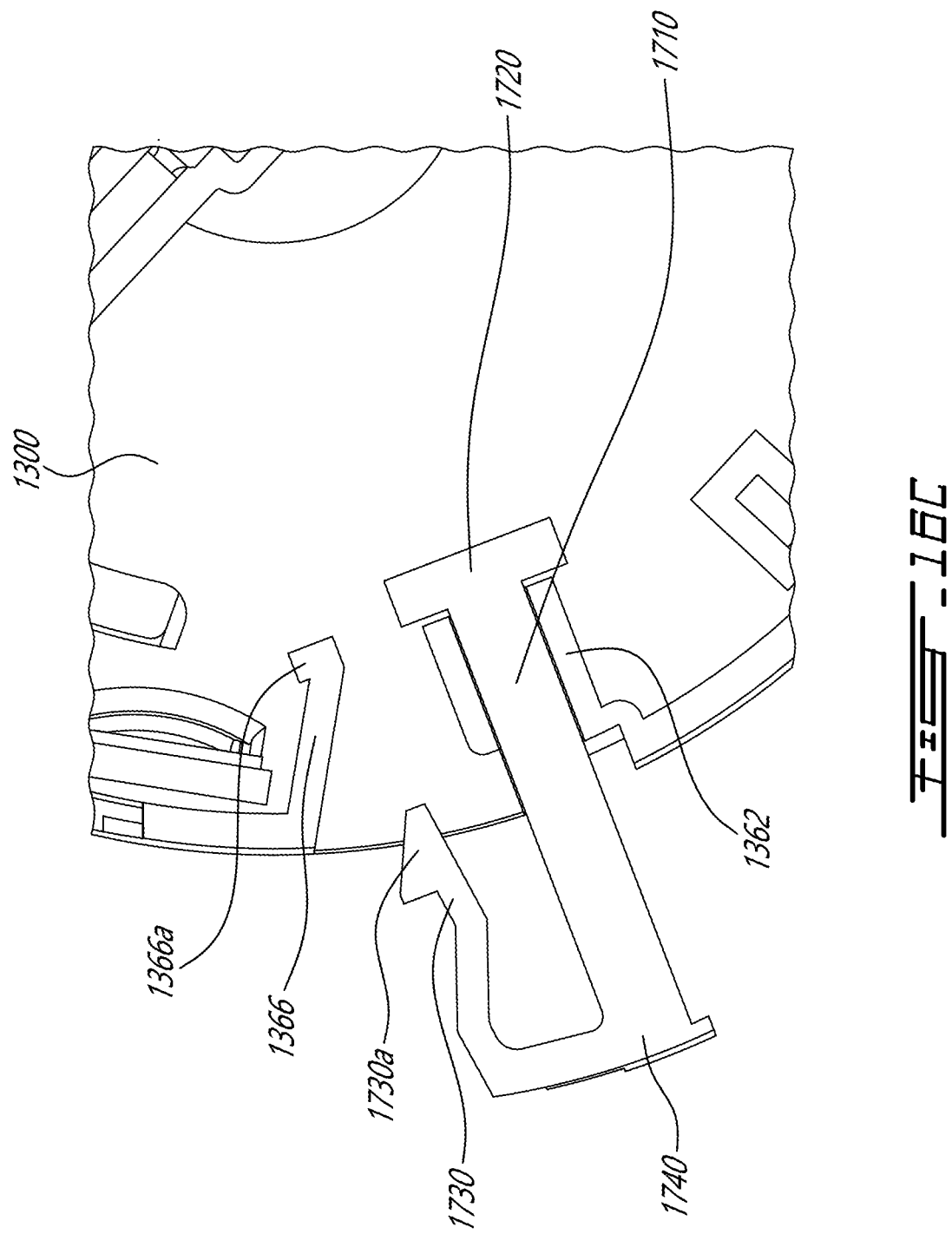

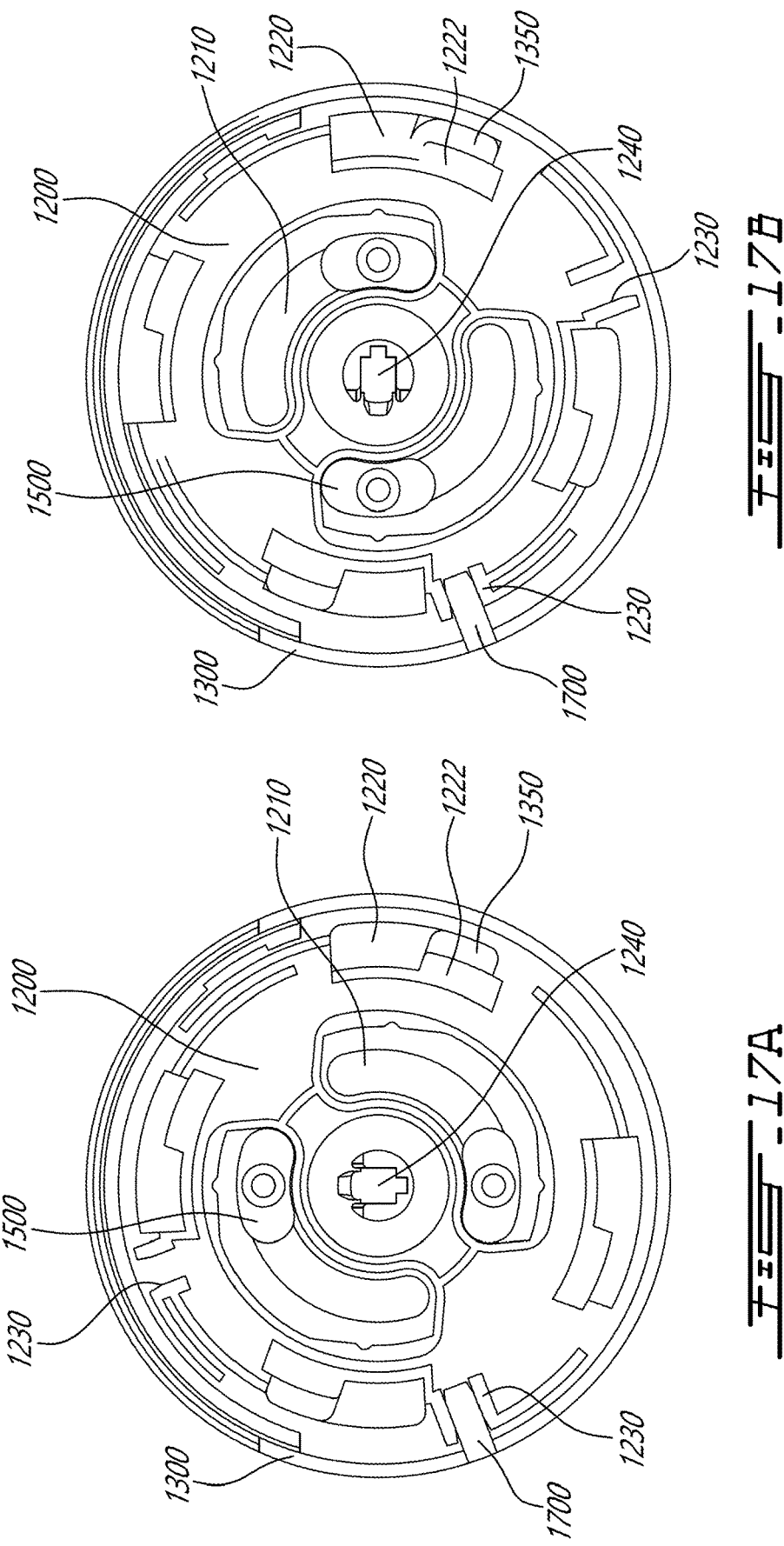

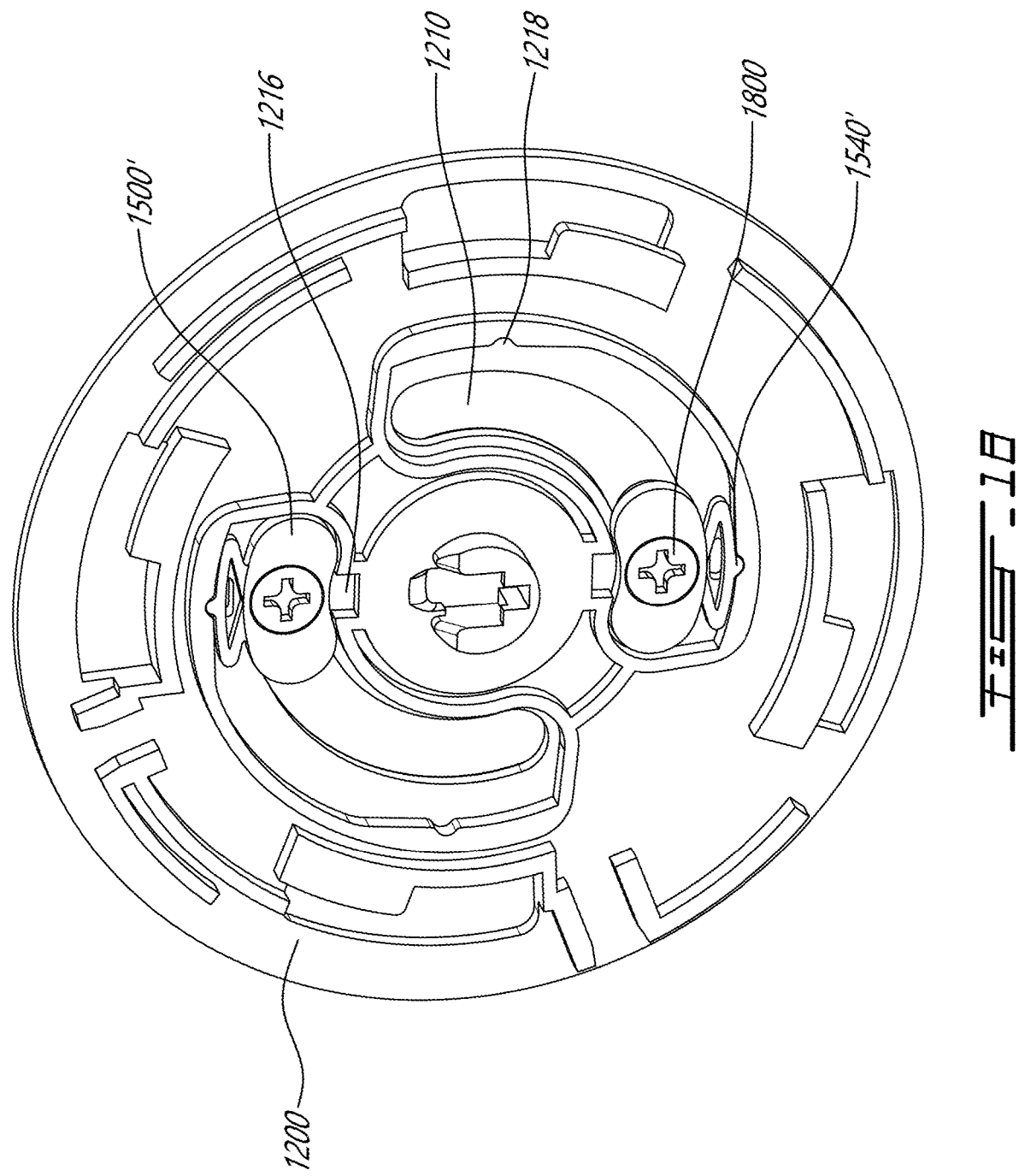

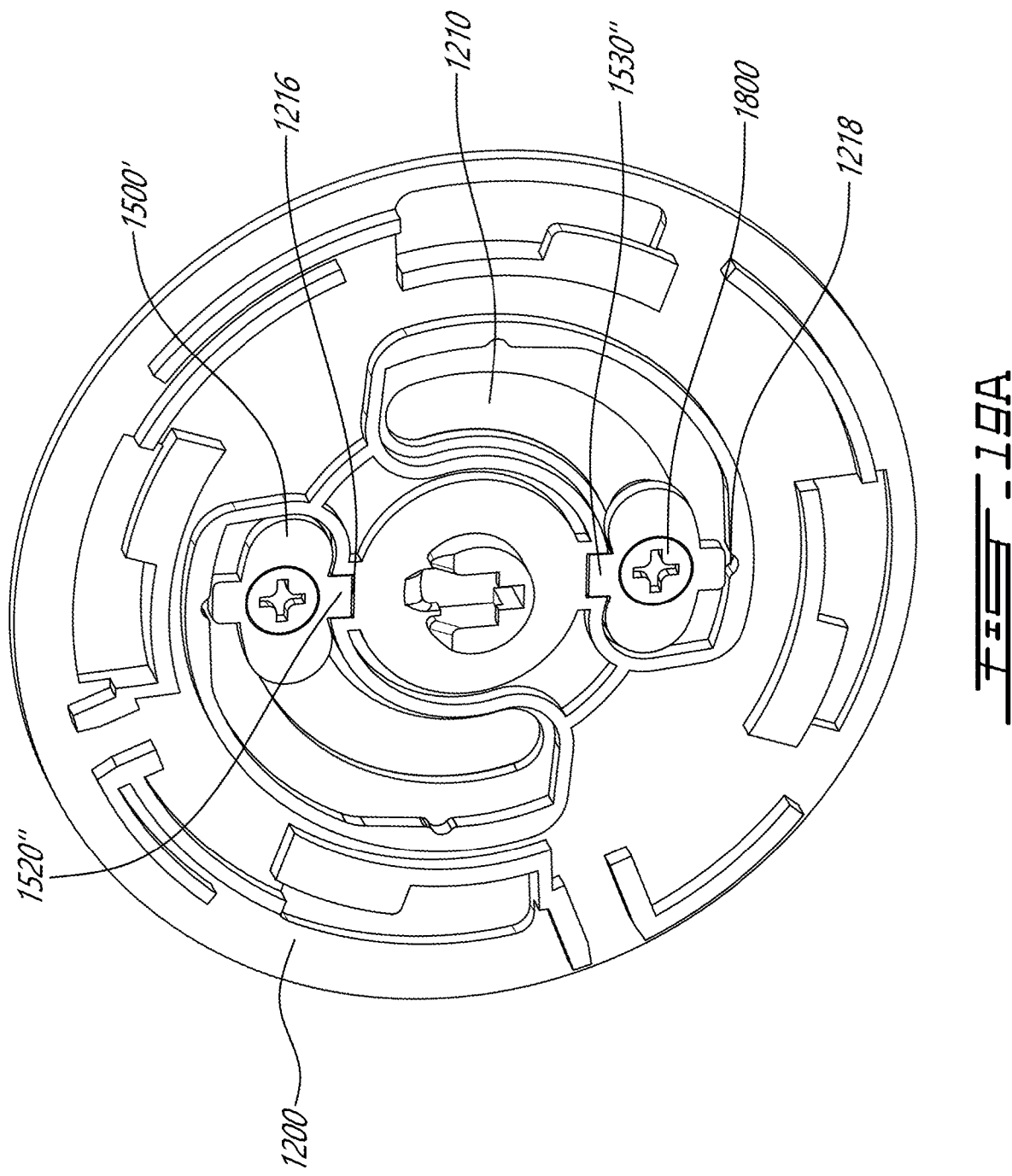

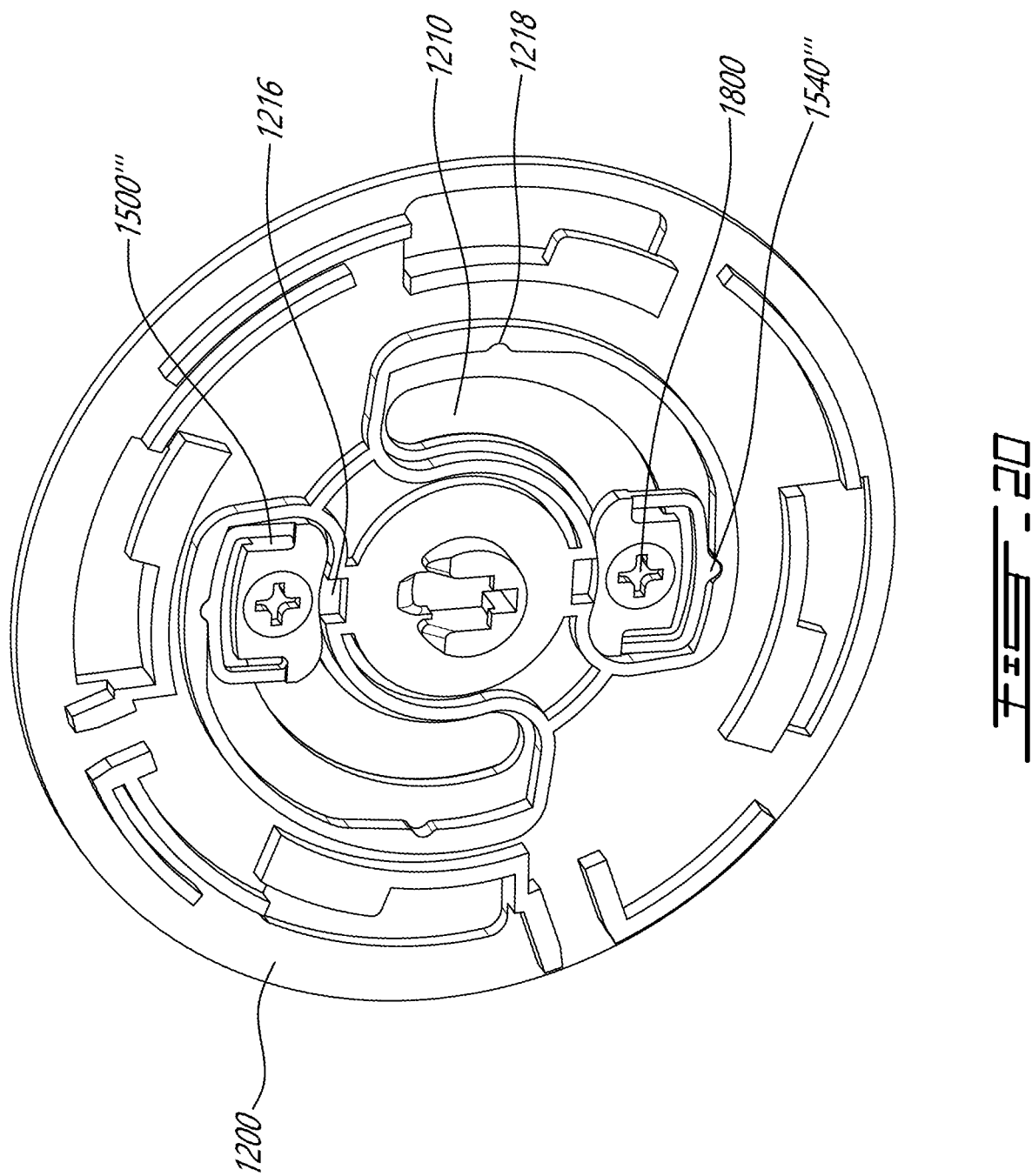

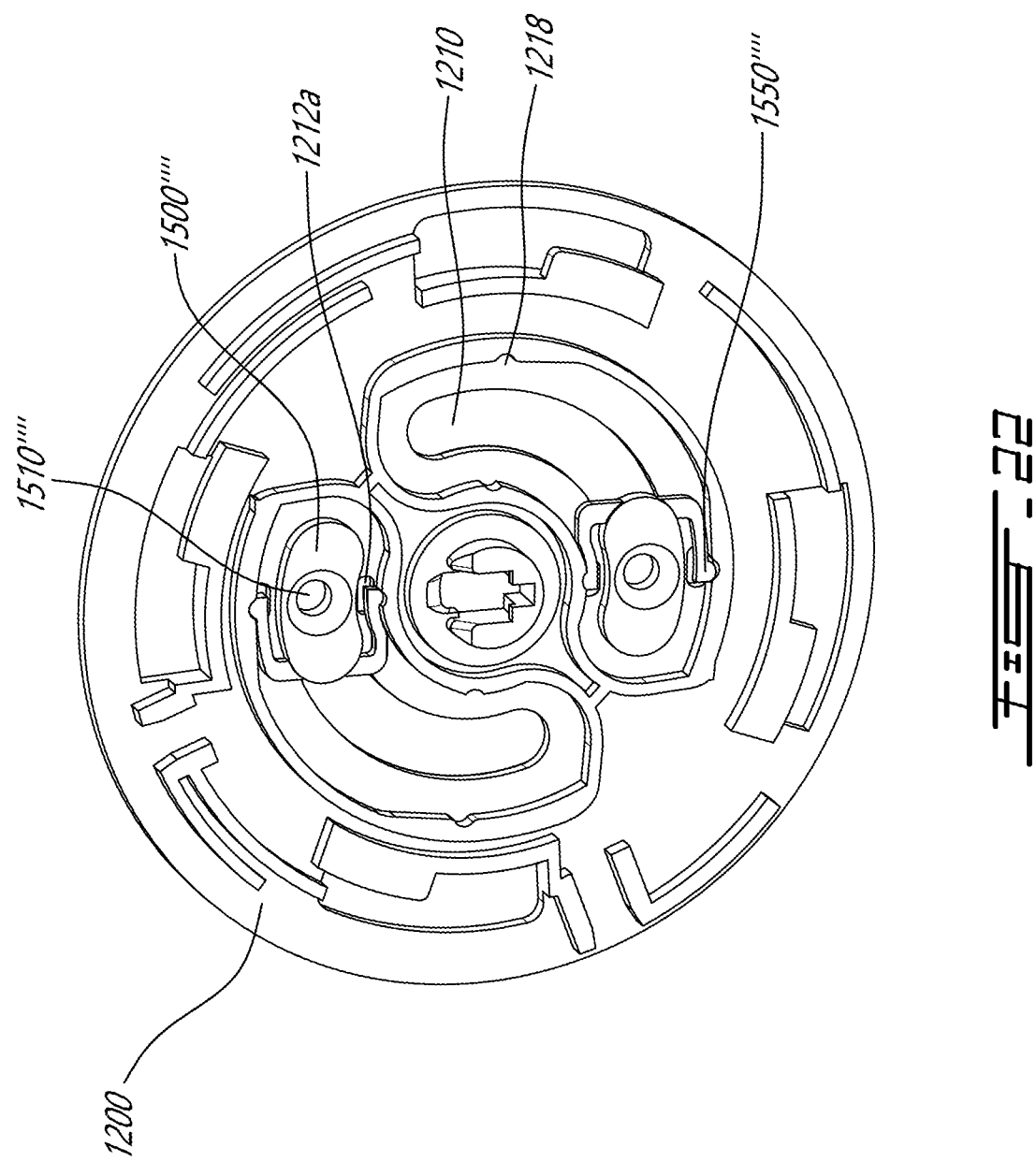

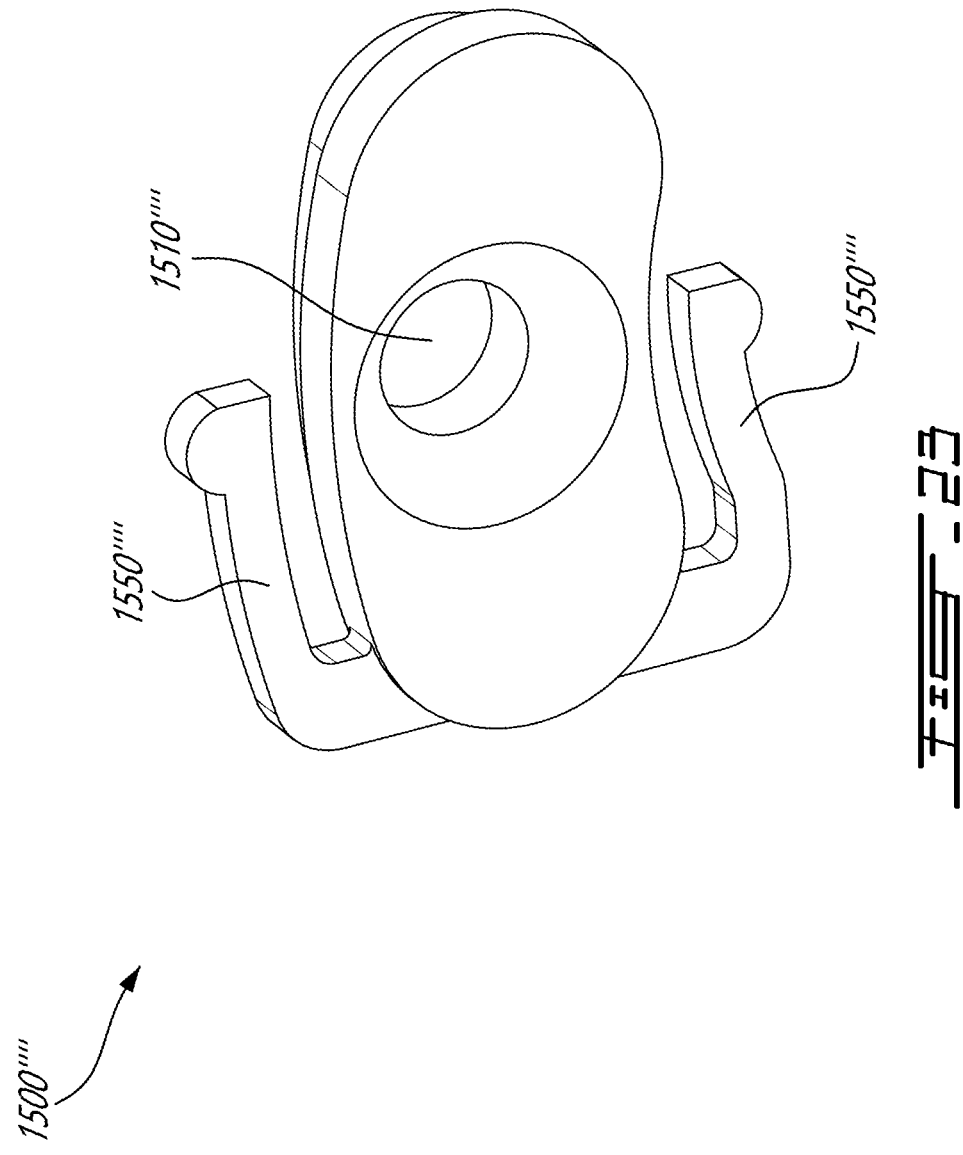

LOCK WITH SERVICEABLE KEYPAD

TECHNICAL FIELD

The present disclosure generally relates to the field of locking devices and more particularly to serviceable locking devices.

BACKGROUND

Rotating dials or components, for example in locking systems, often must be mounted to a surface and locked in place. Such systems often include a baseplate to be mounted to the surface, for example a lockable safe, and a housing unit that is attachable to the baseplate and may house various components, for instance a keypad for interacting with the locking system. Once assembled, typical such systems do not provide access to the various components housed inside the housing unit. As such, it may be difficult to service the keypad or replace the various components housed inside the housing unit.

SUMMARY

In accordance with one aspect, there is provided an attachment system for a locking system mounted to a closure, the attachment system comprising a baseplate fastenable to a mounting surface of the closure, the baseplate including at least one circumferential cutout having an engagement feature, and a locking feature on a surface of the baseplate, a housing having at least one protrusion insertable into the at least one circumferential cutout and rotatably engageable with the engagement feature to selectively prevent the housing from being withdrawn from the baseplate in a direction normal to the mounting surface and a locking device disposed inside the housing and accessible from outside the housing through a cutout defined in at least one of the housing and the baseplate, the locking device operable to rotatably lock and unlock the housing to the baseplate.

In accordance with another aspect, there is provided a method for assembling an attachment system for a locking system, comprising providing a locking device inside a housing, engaging at least one protrusion projecting from the housing with at least one circumferential cutout of a baseplate to mount the housing to the baseplate, rotating the housing relative to the baseplate to rotatably engage the at least one protrusion with an engagement feature in the at least one circumferential cutout to selectively prevent the housing from being withdrawn from the baseplate in a direction normal to a mounting surface, and selectively rotatably locking the housing to the baseplate via the locking device, the locking device operable from outside the housing to selectively rotatably unlock the housing from the baseplate.

Many further features and combinations thereof concerning the present improvements will appear to those skilled in the art following a reading of the instant disclosure.

DESCRIPTION OF THE DRAWINGS

FIG. 1 is a perspective view of a safe with an example locking system;

FIG. 2 is an exploded perspective view of an attachment system, in accordance with an embodiment of the present disclosure;

FIGS. 3A and 3B are front and perspective views of a baseplate for the attachment system of FIG. 2;

FIGS. 4A to 4C are front, perspective and side views of a housing for the attachment system of FIG. 2;

FIGS. 5A and 5B are front perspective and rear perspective views of a latch-button for the attachment system of FIG. 2;

FIGS. 6A to 6B are cross-sectional views taken along line VI-VI of FIG. 4C showing, in sequence, an exemplary assembly of the attachment system of FIG. 2;

FIG. 7 is a cross-sectional view taken along line VI-VI of FIG. 4C of the attachment system of FIG. 2 with exemplary alternate lugs;

FIG. 10 is an exploded perspective view of another attachment system, in accordance with an embodiment of the present disclosure;

FIGS. 11A and 11B are front and perspective views of a baseplate for the attachment system of FIG. 10;

FIGS. 12A to 12C are front, perspective and side views of a housing for the attachment system of FIG. 10;

FIG. 13 is a perspective view of an interlock for the attachment system of FIG. 10;

FIGS. 14A and 14B are partially transparent perspective views showing, in sequence, an exemplary assembly of the attachment system of FIG. 10;

FIG. 15 shows a perspective cross-sectional view taken along line XV-XV of FIG. 11A of the attachment system of FIG. 10;

FIGS. 16A to 16C are enhanced front views showing, in sequence, an exemplary assembly of the attachment system of FIG. 10;

FIGS. 17A and 17B are front views showing exemplary installation orientations of the baseplate for the attachment system of FIG. 10;

FIG. 18 is a perspective view of a baseplate for the attachment system of FIG. 10 with exemplary alternate lugs;

FIGS. 19A and 19B are perspective and exploded perspective views of a baseplate for the attachment system of FIG. 10 with exemplary alternate lugs;

FIG. 20 is a perspective view of a baseplate for the attachment system of FIG. 10 with exemplary alternate lugs;

FIG. 22 is a perspective view of a baseplate for the attachment system of FIG. 10 with exemplary alternate lugs; and FIG. 23 is a front perspective view of an exemplary alternate lug of FIG. 20.

DETAILED DESCRIPTION

Figure 6C:
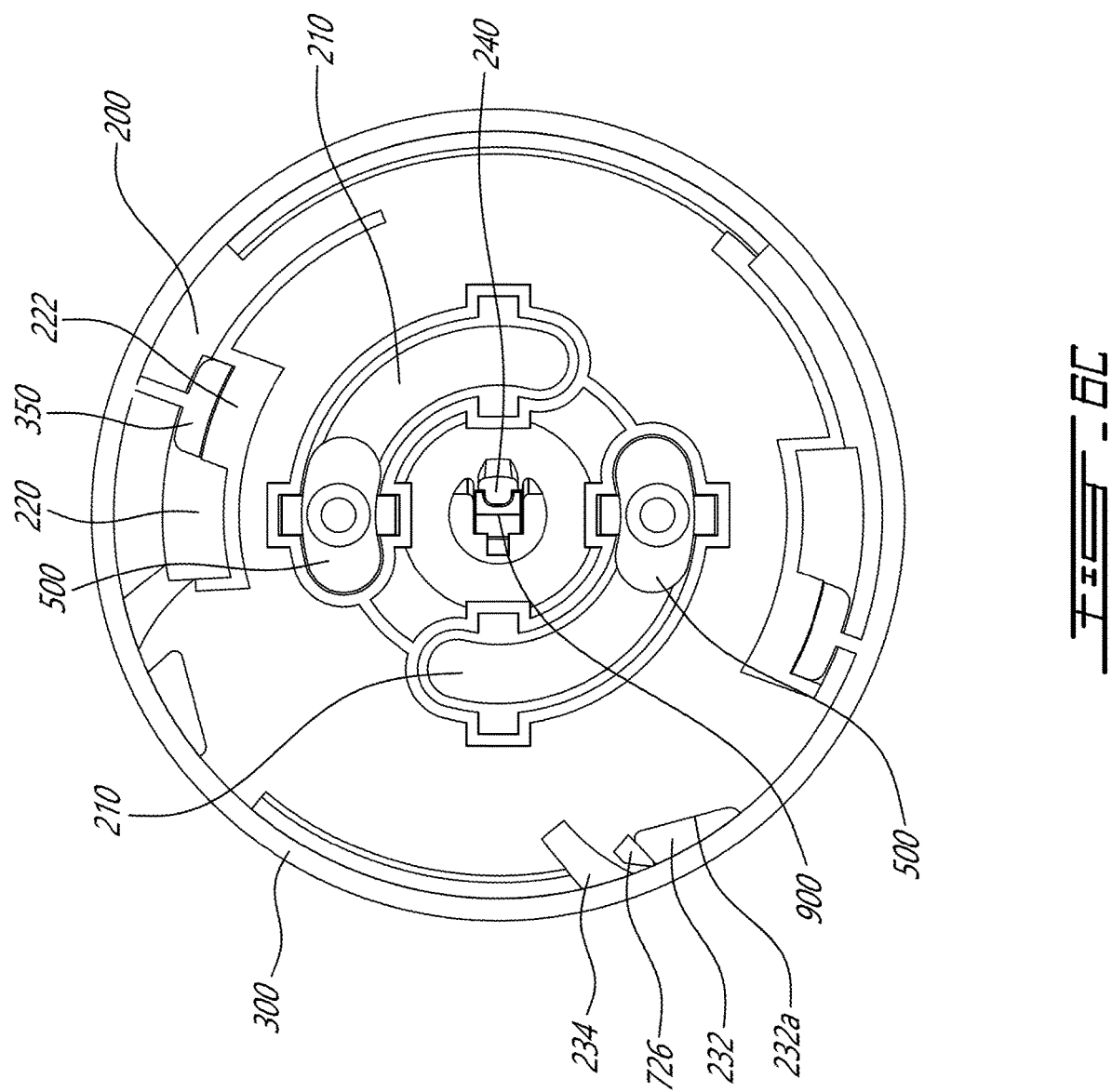
FIG. 6C is a cross-sectional view taken along line VI-VI of FIG. 4C showing an alternate orientation of the attachment system of FIG. 2 in exemplary assembly step of FIG. 6B.

The present disclosure teaches various attachment systems and methods that can be applied, for example, to a locking system or device 10 as shown in FIG. 1. Locking system 10 may be adapted to a closure, such as a safe 12. The safe 12 may be used for personal or commercial use and may be kept in a residence, office, hotel, or other place of business in which items of value are to be safely stored. The safe 12 includes a door 14 that is openable and closable to either allow or prevent access to an inside volume of the safe 12. Illustratively, the door 14 is hingedly mounted to a front side edge of the safe 12 via a pair of hinges 16, although other mounting means and opening means may be considered as well. The door 14 includes a mounting plate 18 mountable to the door 14, for instance via screws or other fastening means. A door handle 20 and an entry device 22 are mountable to the mounting plate 18, as will be discussed in further detail below. In other cases, the door 14 may be adapted to receive the door handle 20 and entry device 22 directly on a surface thereon.

The entry device 22 may provide a user with access to the inside volume of the safe 12, for example via a numerical combination code enterable on a keypad on a surface of the entry device 22. In various embodiments, the keypad may be a soft keypad or a foil keypad. Other keypads may be considered as well. Alternatively, the user may be provided with an electronic key, for example on a keycard or integrated into a mobile application which, when placed proximate to the entry device 22, triggers the unlocking of the locking system 10. The entry device 22 may be operatively connected to a locking means, for instance a deadbolt or a swingbolt, to lock or unlock the safe 12, while the door handle 20 may be operatively connected to a sprung latch for opening and closing the door 14. In various embodiments, the entry device 22 may be powered by one or more onboard batteries or by an auxiliary power supply. In some embodiments, the entry device 22 may include one or more lights and a speaker to alert the user of various events relating to a status of the locking system 10.

Various components of the locking system 10 are rotatably mounted to the door 14, for instance the door handle 20 and a knob (not shown) on an inside surface of the door 14 configured to pull a locking bolt (not shown) away from an edge of the safe 12, while other components are non-rotatably mounted to the door. The entry device 22 is an example of a component of locking system 10 that requires securement to a mounting surface, in this case the mounting plate 18, to which the present disclosure applies. In some cases, such securement is to be in a non-rotatable fashion. However, other components may be considered for such attachment systems and methods as well. The locking system 10 taught by the present disclosure is not limited to the illustrated safe 12 shown in FIG. 1, as other sizes, shapes and styles of safes may implement such a locking system 10 as well. In addition, the present disclosure may be adapted to locking systems for other closures such as a door lock for a building, for instance a hotel room door.

Referring now to FIG. 2, an embodiment of an attachment system 100 is shown for mounting a component of a locking device, for example the entry device 22, to a mounting surface, for example the mounting plate 18 or directly on the door 14 of the safe 12. The attachment system 100 includes a baseplate 200, a housing 300, and a keypad 400. FIG. 2 shows an exploded view of the attachment system 100 along an axis X. Various metals, plastics, polymers or other like materials may be used for the baseplate 200, housing 300 and keypad 400. In various embodiments of the present disclosure, the keypad 400 and housing 300 may be removably attachable or mountable to the baseplate 200, for instance to service or replace the keypad 400 or various components stored or housed within the housing 300.

Referring additionally to FIGS. 3A-3B, the baseplate 200 is fastenable or attachable to a mounting surface, for example the mounting plate 18 or directly on the door 14. While the baseplate 200 is shown as being substantially circular, other shapes may be considered as well. In the shown embodiment, the baseplate 200 includes two circumferential tracks 210 defined about a center point C thereof that may be sized to receive lugs 500 (see FIG. 2) to securely attach the baseplate 200 to the mounting surface and support the weight of the housing 300 and any components housed within. The lugs 500 may include apertures 510 to pass through screws or other like fasteners (not shown) to corresponding threaded openings in the mounting surface to secure the baseplate 200 to the mounting surface. Other attachment means may be considered as well to securely attach the baseplate 200 to the mounting surface and support the weight of the housing 300 and any components housed within. The circumferential tracks 210 may have rims or other lip-like engagement features 212 spanning a portion or all of their arc. The lugs 500, which are directly attached to the mounting surface, may thus engage with the rims or other lip-like engagement features 212 to support the baseplate 200. The circumferential tracks 210 may further include walls 214 (FIG. 3B) protruding from the surface of the baseplate 200 in a direction parallel to the X axis and spanning a portion or all of the circumference of each circumferential track 210. The baseplate 200 is thus rotatable about the center point C, with its movements defined by the movement of the circumferential tracks 210 relative to the stationary lugs 500. In some embodiments, a single or multiple circumferential tracks 210 may span all or part of the circumference of the baseplate 200.

The baseplate 200 further includes one or more circumferential cutouts 220 defined about the center point C thereof, illustratively four circumferential cutouts 220, each having a lip-like engagement feature 222 spanning a portion of the arc of each circumferential cutout 220 for rotational engagement with portions of the housing 300, as will be discussed in further detail below. The baseplate 200 further includes a locking feature 230 on a front surface 202 of the baseplate, illustrative towards an outer circumference of the baseplate 200, which illustratively includes an angled ramp-like feature 232 with a catch portion 234. The locking feature 230 is operable for rotatably locking and unlocking the housing 300 to the baseplate 200 upon engagement with a locking device 700, as will be discussed in further detail below. In the shown embodiment, the baseplate 200 includes two such locking features 230, which may allow the baseplate 200 to be installed against the mounting surface in different orientations. Other numbers of locking features 230 may be contemplated as well. The baseplate 200 further includes a central cutout 240, for instance for receiving a spindle 900 (see FIGS. 6A-6C) and cable (not shown) passing through the door 14 of the safe 12 for the locking system 10.

Referring additionally to FIGS. 4A-4C, the housing 300 may house various mechanical and electrical components of a locking system 10, for example a printed circuit board (PCB), one or more batteries, an electronic key reader, one or more lights, a speaker, etc. The housing 300 may house various means of input or output such as a radio-frequency transceiver or a Bluetooth™ module. Housing 300 may be used to house other components to be mounted to various surfaces as well. Alternatively, an additional housing (not shown) may be provided to house such components and attach to the housing 300 through various attachment means.

In the shown embodiment, the housing 300 has a circular shape with a diameter approximately the same as that of the baseplate 200, although other shapes and sizes for the housing 300 may be contemplated as well. The housing 300 has a front surface 302 and a rear surface (not shown) relative to the X axis. The outer circumference of the housing 300 has a sidewall 310 spanning most of the outer circumference of the housing 300. In the shown embodiment, the housing 300 includes seats or slots 320, illustratively two slots 320, configured to receive replaceable batteries 600 used to power the keypad 400. Other powering means may be contemplated as well, as will be discussed in further detail below.

In the shown embodiment, the sidewall 310 includes a sidewall cutout 312 configured to allow a user to operate a locking device 700 insertable into the housing 300, the locking device operable to lock the housing 300 to the baseplate 200. In other embodiments, the baseplate 200 may include a sidewall protruding outwardly from the outer circumference of the front surface 202 thereof. The baseplate sidewall may extend partially or fully about the outer circumference thereof and be operable to receive the housing 300 therein. The baseplate sidewall may include a sidewall cutout providing a user access to the locking device 700 housed within the housing 300. In other embodiments, the locking device 700 may be received within the baseplate and a user may access the locking device 700 via sidewall cutout 312 through the housing sidewall 310 or via a baseplate sidewall.

In the shown embodiment, upon mounting to the baseplate 200, the sidewall cutout 312 is rotationally positionable adjacent the locking feature 230 for engagement of the locking device 700, as will be discussed in further detail below. The housing 300 thus includes an additional cutout 330 and posts 332, 334 and aperture 336 for receiving and retaining the locking device 700. The housing 300 further includes a plurality of retention tabs 340 extending from the front surface 302 in the direction of the X axis. In the shown case, the housing 300 includes three retention tabs 340, although other numbers of retention tabs 340 may be contemplated as well. The retention tabs 340 may be configured to engage with corresponding elements on the underside of the keypad 400 to retain the keypad 400 to the housing 300. As such, in the shown case, each retention tab 340 may be flexible and include a hook or tang 342 at a distal end thereof.

Referring additionally to FIGS. 6A-6C, the rear surface of the housing 300 includes one or more protrusions 350, illustratively two protrusions 350, emanating from the outer circumference and/or the rear surface of the housing 300. The protrusions 350 may be integral with the housing 300 or may be add-on components. The protrusions 350 are insertable into the circumferential cutouts 220 and rotationally engageable with the lip-like engagement features 222 prevent the housing 300 from being withdrawn from the baseplate 200 in the direction of the X axis, as will be discussed in further detail below.

Referring additionally to FIGS. 5A-5B, in the shown embodiment the locking device 700 includes a spring 710 (see FIG. 2) and a latch-button 720. Other locking devices may be contemplated as well, as will be discussed in further detail below. The illustrated latch-button includes a post 722 insertable into a corresponding aperture 336 in housing 300. Post 722 includes a coaxial aperture 724 for receiving a fastener 800 (see FIG. 2) for fastening the locking device 700 to the housing 300. Other attachment means may be contemplated as well. The latch-button 720 further includes a latch 726 protruding from the latch-button 720 and engageable with the locking feature 230 in the baseplate 200, as will be discussed in further detail below, and a button 728 for engaging and disengaging the latch-button 720. The latch-button 720 further includes an attachment point 730 for the spring 710, which may correspondingly attach to the post 334 in the housing 300.

Referring again to FIGS. 6A-6C in addition to FIGS. 2-5B, an exemplary assembly process of an attachment system 100 will now be described. FIGS. 6A-6C show a cross-sectional view of an assembled attachment system taken along line VI-VI in FIG. 4C. The baseplate 200 is fastened to a mounting surface, for instance via lugs 500. The housing 300, with an attached keypad 400, is rotatably aligned with the baseplate 200 so that the protrusions 350 are received within the circumferential cutouts 220. The locking device 700 is inserted into the housing 300 and positioned adjacent the sidewall cutout 312 for activation or operation through the sidewall cutout 312. The housing 300 is thus rotatably aligned with the baseplate 200 so that the locking device 700, illustratively the latch 726, is adjacent the locking feature in the baseplate 200. The housing 300 is then rotated relative to the baseplate 200 so that the protrusions 350 travel circumferentially within respective circumferential cutouts 220 until they engage with respective lip-like engagement features 222, which prevents removal of the housing 300 from the baseplate 200 in a direction parallel to the X axis. In some embodiments, protrusions 350 and lip-like engagement features 222 form a bayonet mount-type connection, with the protrusions 350 acting as pin-like male connectors and the lip-like engagement features 222 acting as the female receptors. Concurrently, the latch 726 travels upwardly along an inner circumferential surface 232a of the angled ramp-like feature 232 until it drops into catch portion 234 (see FIG. 6B), thereby rotatably locking the housing 300 to the baseplate 200. In such a configuration, additional rotation imparted to the housing 300 will concurrently rotate the baseplate 200, for instance to operate a deadbolt or springbolt-based locking mechanism 10 via spindle 900. For instance, as shown in FIG. 6C, rotation of the combined housing 300 and baseplate 200, which is delimited by the movement of the lugs 500 in the circumferential tracks 210, may turn the spindle 900, illustratively by ninety degrees, to operate the connected locking mechanism. In the shown case, the locking system 10 may allow the keypad 400 to operate a deadbolt-based lock via the spindle 900, although other lock types may be contemplated as well.

The housing 300 may be released from the baseplate 200 by pressing the button 728 to compress the spring 710 and release the latch 726 from the catch portion 234. Once the latch 726 is free from the catch portion, the user is free to rotate the housing 300 without said rotation being transferred to the baseplate 200. Said rotation may thus allow the latch 726 to slide down the inner circumferential surface 232a of the angled ramp-like feature 232 and the protrusions 350 to be freed from the lip-like engagement features 222 so the housing 300 can be removed from the baseplate 200. For instance, such removal may allow a user to service or replace the keypad 400, replace the batteries 600 within the housing 300, and/or service or replace other components stored within the housing 300, without requiring the spindle 900 or cable (not shown) to be disengaged from the locking mechanism of the locking device 10. Other assembly processes may be contemplated as well.

Referring to FIG. 7, in some cases the attachment system 100 may be used for a swingbolt-type locking system 10. In such cases, the lugs 500' may include locking features or protrusions 520' engageable with slots 216 to prevent rotation of the baseplate 200 relative to the mounting surface once the lugs 500' are attached, as is desirable for swingbolt-type locking systems. In the shown case, both the protrusions 520' and slots 216 are square-shaped to facilitate engagement, although other shapes may be contemplated as well. As such, in the shown case, once the locking device 700 is engaged with the locking feature 230, the housing 300 and keypad 400 may no longer be rotatable relative to the baseplate 200 or the mounting surface until locking device 700 is disengaged, for instance by pressing button 728. The shown lugs 500' may be used in other locking systems where the baseplate 200 is non-rotatable relative to the mounting surface as well.

Figure 8A:
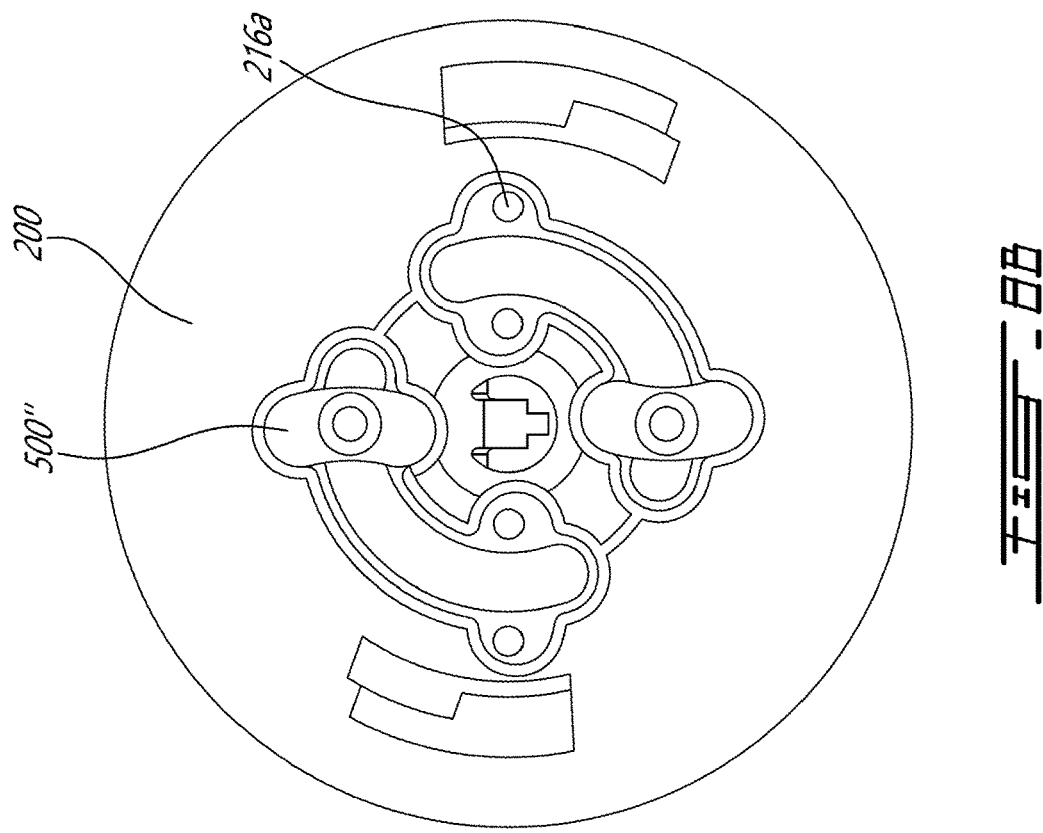
FIGS. 8A and 8B are front views of an alternate baseplate for the attachment system of FIG. 2 with exemplary alternate lugs in different positions.
Figure 8B:
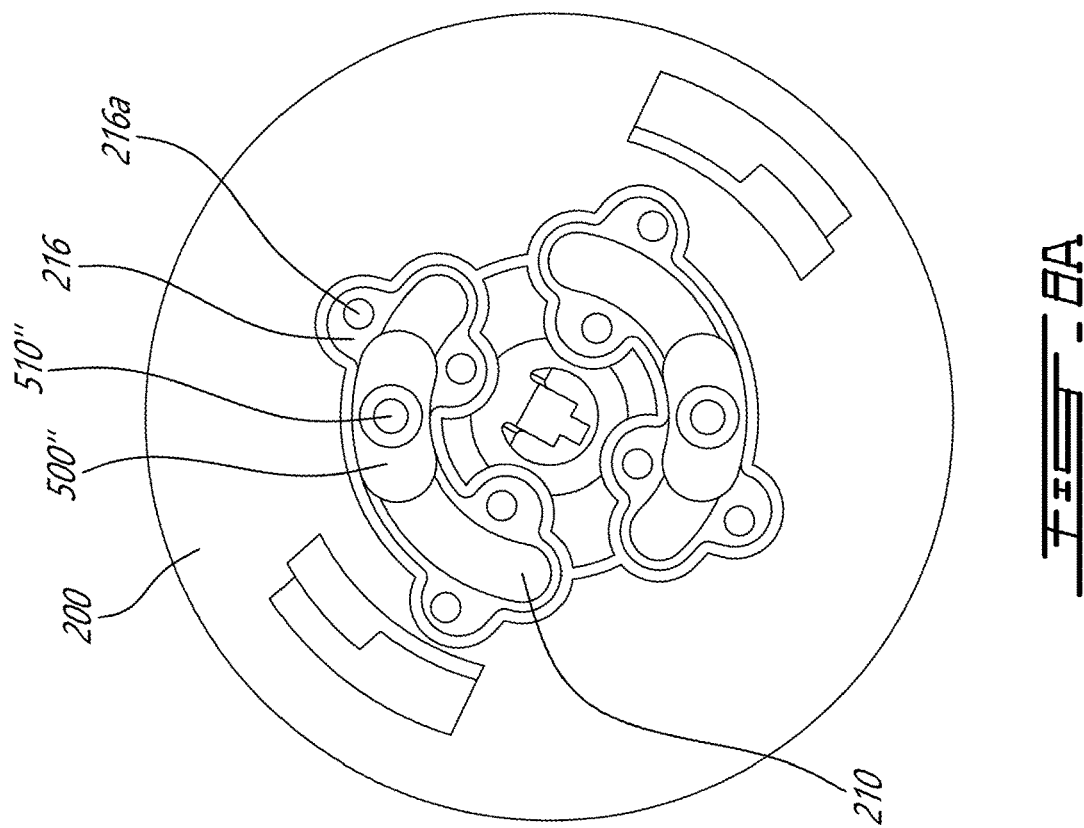
Figure 9B:
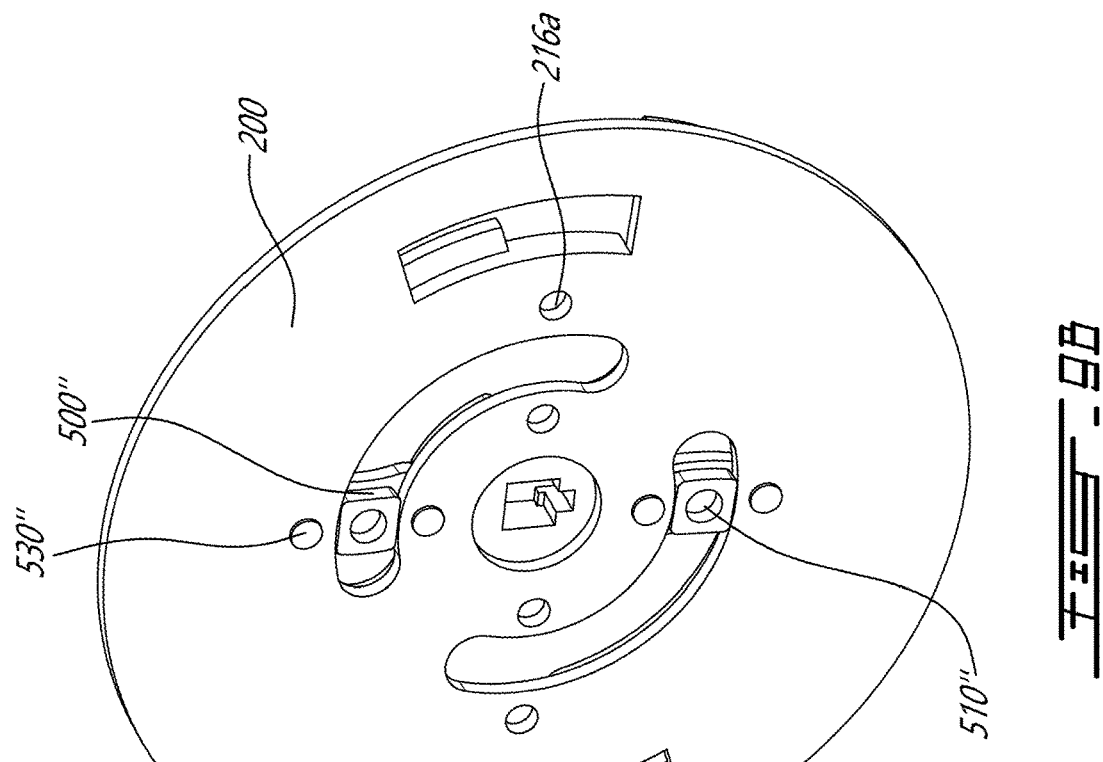
FIGS. 9A and 9B are rear views of the alternate baseplate shown in FIGS. 8A and 8B, respectively.
Figure 9A:
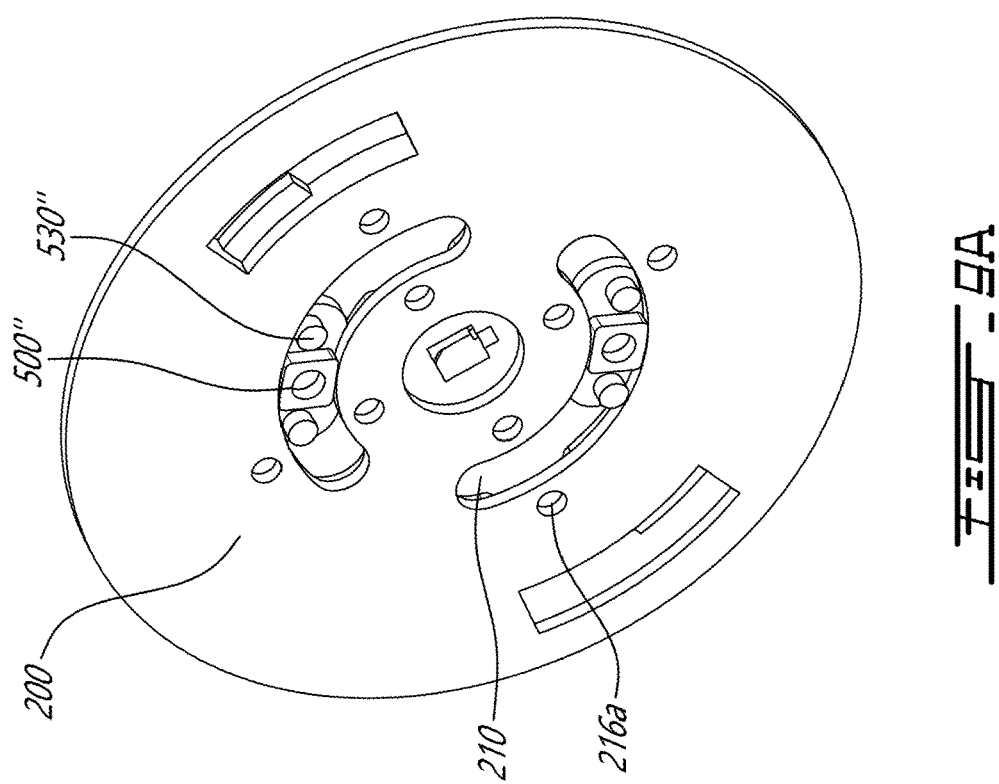

Referring to FIGS. 8A-9B, another embodiment of a lug 500" is shown. In this case, lug 500" may be usable in locking systems where the baseplate 200 is rotatable relative to the mounting surface, for instance deadbolt-type locking systems, and in locking systems where the baseplate 200 is non-rotatable relative to the mounting surface, for instance swingbolt-type locking systems. In the depicted embodiment, lugs 500" have a curved body and are operable to slide through respective circumferential tracks when oriented in a first position, as depicted in FIGS. 8A and 9A. Thus, with lugs 500" oriented in this first position, the baseplate 200 is rotatable relative to the mounting surface. Lugs 500" further include pins 530" protruding from an underside thereof and operable to engage with apertures 216a of slots 216. As such, in a second position, as depicted in FIGS. 8B and 9B, the lugs 500B are rotatable so that they engage with slots 216 with pins 530 engaging with apertures 216a. Thus, with lugs 500" oriented in this second position, the baseplate 200 is non-rotatable relative to the mounting surface. The same design for baseplate 200 and lugs 500" may thus be used for different locking systems, for instance deadbolt-type locking systems and swingbolt-type locking systems.

Referring now to FIG. 10, another embodiment of an attachment system 1100 is shown for mounting a component of a locking device, for example the entry device 22, to a mounting surface, for example the mounting plate 18 or directly on the door 14 of the safe 12. The attachment system 1100 includes a baseplate 1200, a housing 1300, and a keypad 1400. FIG. 10 shows an exploded view of the attachment system 1100 along an axis X. Unless otherwise specified, like reference numerals from attachment system 100 refer to like parts in attachment system 1100, with a growth factor of 1000. Attachment system 1100 may be referred to as a low profile attachment system, as will be discussed in further detail below. A locking device 1700, illustratively an interlock insertable into the housing 1300, is configured to retain the housing 1300 to the baseplate 1200 in a non-rotatable fashion, as will be discussed in further detail below.

Referring additionally to FIGS. 11A-11B, baseplate 1200 is shown for the low profile attachment system 1100. As was the case with baseplate 200, baseplate 1200 includes circumferential tracks 1210 and circumferential cutouts 1220 disposed about center C. Circumferential tracks 1210 include rims or lip-like engagement features 1212 for engagement with lugs 500, illustratively with apertures 1212a disposed therethrough. Circumferential cutouts 1220 include lip-like engagement features 1222 for engagement with protrusions 1350 of the housing 1300. The shown low profile attachment system 1100 includes a locking feature 1230, illustratively two parallel protrusions forming a track, for engagement with the locking device 1700, as will be discussed in further detail below. In the shown case, baseplate 1200 includes two locking features 1230, for instance to allow the baseplate to be installed at different orientations against the mounting surface. Other numbers of locking features 1230 may be contemplated as well.

Referring additionally to FIGS. 12A-12C, housing 1300 is shown for the low profile attachment system 1100. Compared to housing 300 for attachment system 100, housing 1300 is thinner relative to the X axis, contributing to the overall lower profile of attachment system 1100. Unlike housing 300, housing 1300 may not be operable to contain batteries 600 to power, for instance, the keypad 1400. Rather, the keypad 1400 is operable to receive power from a power source housed within the safe 12, for instance via a cable (not shown) passing through the door 14. In cases where emergency power for the keypad 1400 is needed, an emergency power supply 1600 may be provided. The housing 1300 may include a cutout 1320 through the front surface 1302 to the rear surface (not shown) thereof adjacent a cutout 1312 in the sidewall 1310. The cutout 1312 may be configured to receive an access hatch 1610 pivotable about a post inserted through aperture 1322 to receive the emergency power connector 1620 and cable 1630. Other power systems may be contemplated as well.

Along the sidewall 1310 of the illustrated housing 1300, a housing locking feature 1360 includes a parallel track 1362, a central cutout 1364 between the track 1362 and opening towards the sidewall 1310, and an angled wall 1366 circumferentially adjacent the track 1362. Track 1362 may be sized to correspond with the track of locking system 1230, as will be discussed in further detail below.

Referring additionally to FIG. 13, in the shown case, locking device 1700 is shown as an interlock 1700. Interlock 1700 includes a body 1710 having a thicker portion 1710a towards a first or proximal end and a thinner portion 1710b towards a second or distal end, and a retention feature 1720 at the second or distal end. In the shown case, the retention feature 1720 is T-shaped, although other shapes for retention feature 1720 may be contemplated as well. The interlock 1700 further includes a flexible snap hook 1730, also referred to as a shim, attached to the body 1710. The snap hook 1730 includes a front end 1730a with a sloping angle at a distal end thereof. The body 1710 includes a ridge 1740 protruding downwardly at the first or proximal end, illustratively protruding further downward than the thickness of the thicker portion 1710a.

Figure 14A:
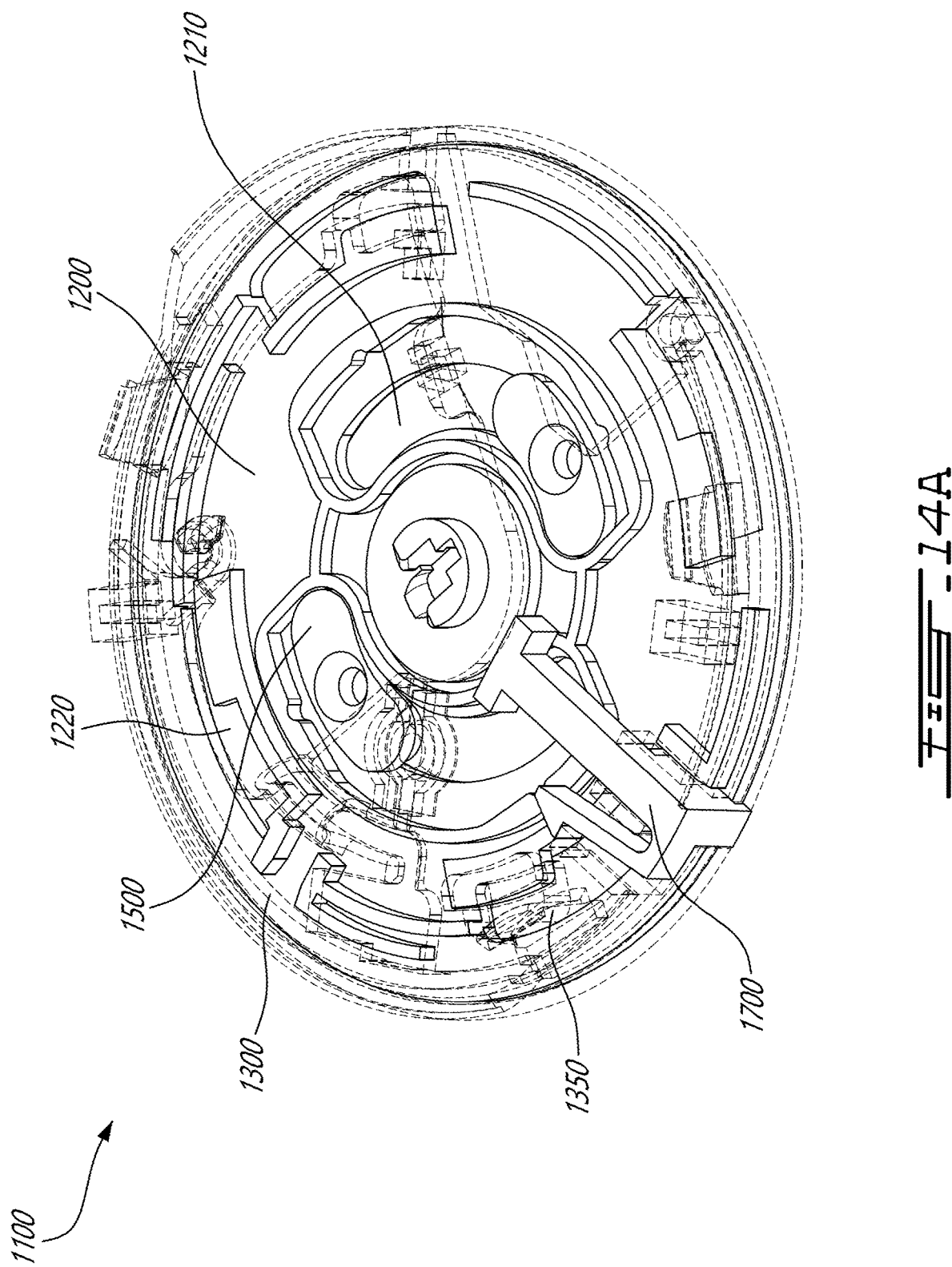
Figure 16A:
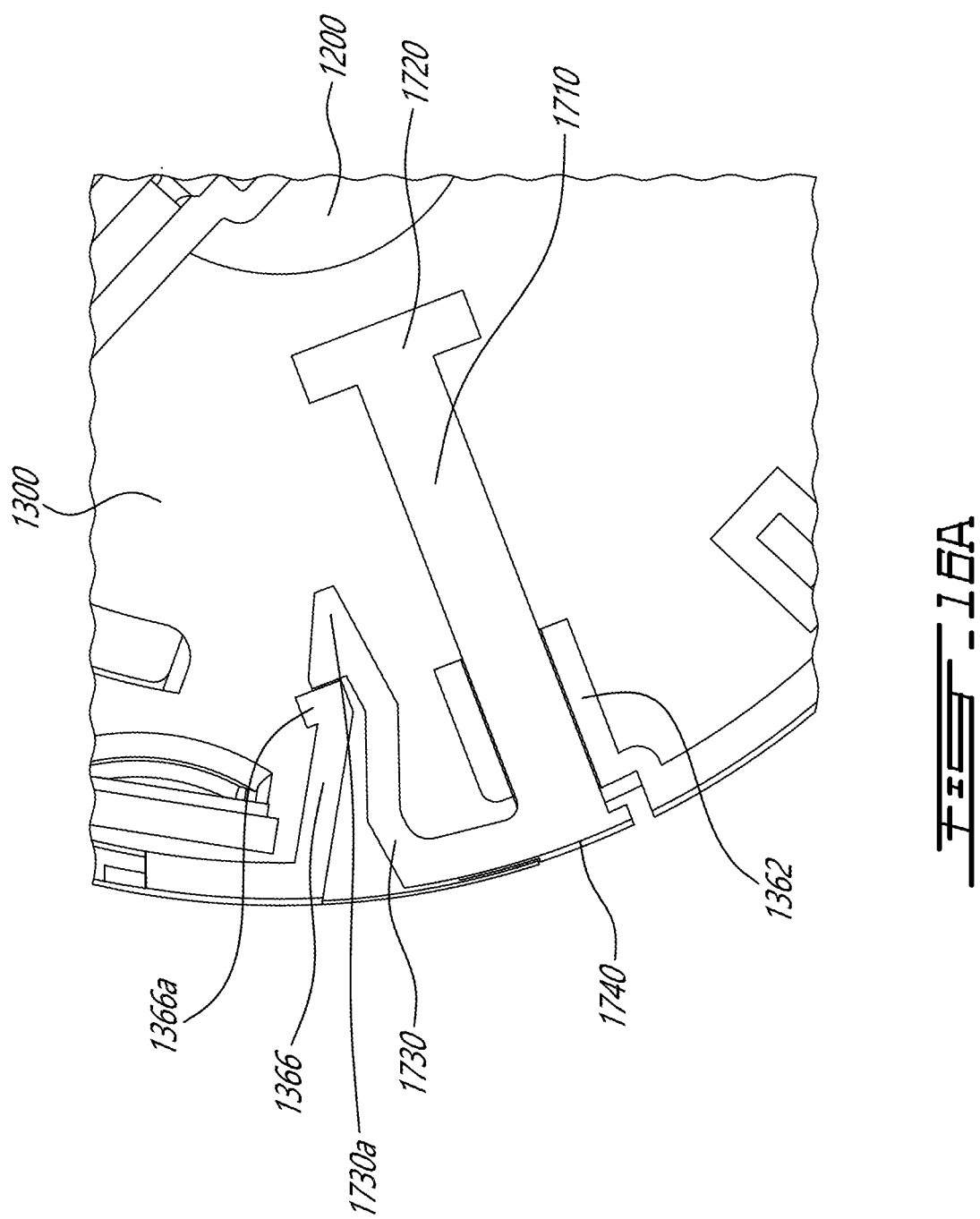
Figure 16B:
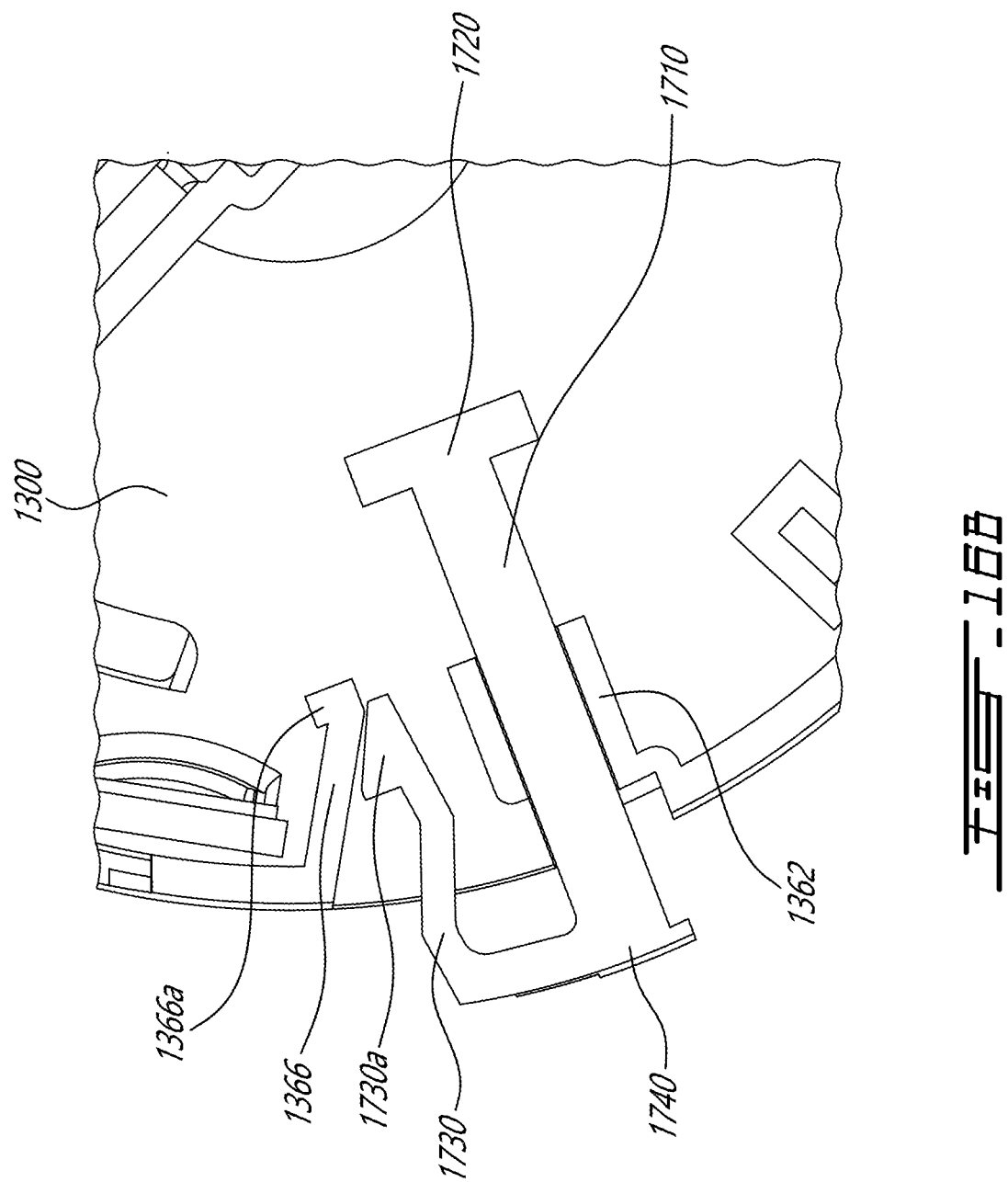

Referring additionally to FIGS. 14A-16O, an exemplary assembly process of an attachment system 1100 will now be described. FIGS. 14A-14B shown a partially translucent view of an assembled attachment system 1100 with the interlock 1700 in various positions. FIG. 15 shows a perspective, cross-sectional view of an assembled attachment system 1100 taken along line XV-XV in FIG. 11A. FIGS. 16A-16C show an enhanced view of the interlock 1700 engaging with the housing 1300 in various positions. The baseplate 1200 is fastened to a mounting surface, for instance via lugs 1500. The housing 1300, with an attached keypad 1400, is rotatably aligned with the baseplate 1200 so that the protrusions 1350 are received within the circumferential cutouts 1220. The housing 1300 is then rotated relative to the baseplate 1200 so that the protrusions 1350 travel circumferentially within respective circumferential cutouts 1220 until they engage with respective lip-like engagement features 1222, which prevents removal of the housing 1300 from the baseplate 1200 in a direction parallel to the X axis. The interlock 1700 may be pre-inserted into the housing so that the body 1710 is positioned between the track 1362. Thus, when the housing 1300 is mounted to the baseplate 1200 and rotated so that the protrusions 1350 engage the lip-like engagement features 1222, the housing feature 1360 may be aligned with the locking feature 1230. The interlock 1700 may be slid radially inwardly so that the thicker portion 1710a protrudes downwardly through the aperture 1322 and engages with the locking feature 1230. Simultaneously, the flexible snap hook 1730 slides along the angled wall 1366 until the front end 1730a hooks onto a distal end 1366a of the angled wall 1366 (see FIGS. 14A and 16A), rotatably locking the housing 1300 to the baseplate 1200. As shown in FIG. 16B, the shape of the front end 1730a may aid in guiding the front end 1730a towards the distal end 1366a. In such a rotatably locked configuration, additional rotation imparted to the housing 1300 will concurrently rotate the baseplate 1200, for instance to operate a deadbolt-based locking mechanism via a spindle (not shown). In other cases, for instance to operate a swingbolt-based locking mechanism 10, no additional rotation may be imparted to the housing 1300 once the interlock 1700 is installed.

To remove the housing 1300 from the baseplate 1200, for instance to service or replace the keypad, the interlock 1700 may be disengaged. To disengage the interlock 1700, a user may apply force to the flexible snap hook 1730 to bias the front end 1730a away from the distal end 1366a of the angled wall 1366. Various tools or devices may be used to apply such force, such as a screw driver, a car key, or any suitable thin object. Simultaneously, the user may pull the interlock 1700 via the ridge 1740 so that the interlock 1700 travels radially outwardly from the attachment system 1100. As shown in FIGS. 14B and 16C, once the interlock 1700 has been sufficiently removed from the attachment system 1100, the thicker portion 1710a of the body 1710 is positioned outside of the attachment system 1100 and thus is no longer engaged with the locking feature 1230 of the baseplate 1200. The retention feature may abut the radially inner ends of the track 1362, preventing full removal of the interlock 1700 from the housing 1300. At this point, the housing 1300 is free to rotate relative to the baseplate 1200, and may be rotated so that the protrusions 1350 disengage from the lip-like engagement features 1222 and the housing 1300 can be removed from the baseplate 1200.

Referring additionally to FIGS. 17A-17B, as discussed above, the baseplate 1200 may be installed against the mounting surface, for instance mounting plate 18, in various orientations. Positioning of the circumferential tracks 1210 and lugs 1500 may allow the baseplate 1200 to be rotated relative to the mounting surface before the fasteners (not shown) are introduced to fasten the baseplate 1200 to the mounting surface. Illustratively, the baseplate 1200 of FIG. 17A is rotated ninety degrees relative to the baseplate 1200 of FIG. 17B. Other orientations may be contemplated as well.

Referring additionally to FIG. 18, in various embodiments the baseplate 1200 may include slots 1216 and detents 1218 to engage with various types of lugs. Such detents 1218 may combine with the lugs 1500' shown in FIG. 18 to create a homing effect. For instance, the housing 1300 and keypad 1400 may rotate freely (for instance for a deadbolt-based locking system), while the detent features will bias the housing 1300 towards a 'home' position, i.e. where the lugs 1500' engage with the detents 1218. As such, the shown lugs 1500' include flexible locking features 1540' that are engageable with the detents 1218 when the lugs reach circumferential ends of the circumferential tracks 210, and disengageable when a user rotates the housing 1300. Other detent and locking means may be contemplated as well, as will be discussed in further detail below.

Figure 19B:
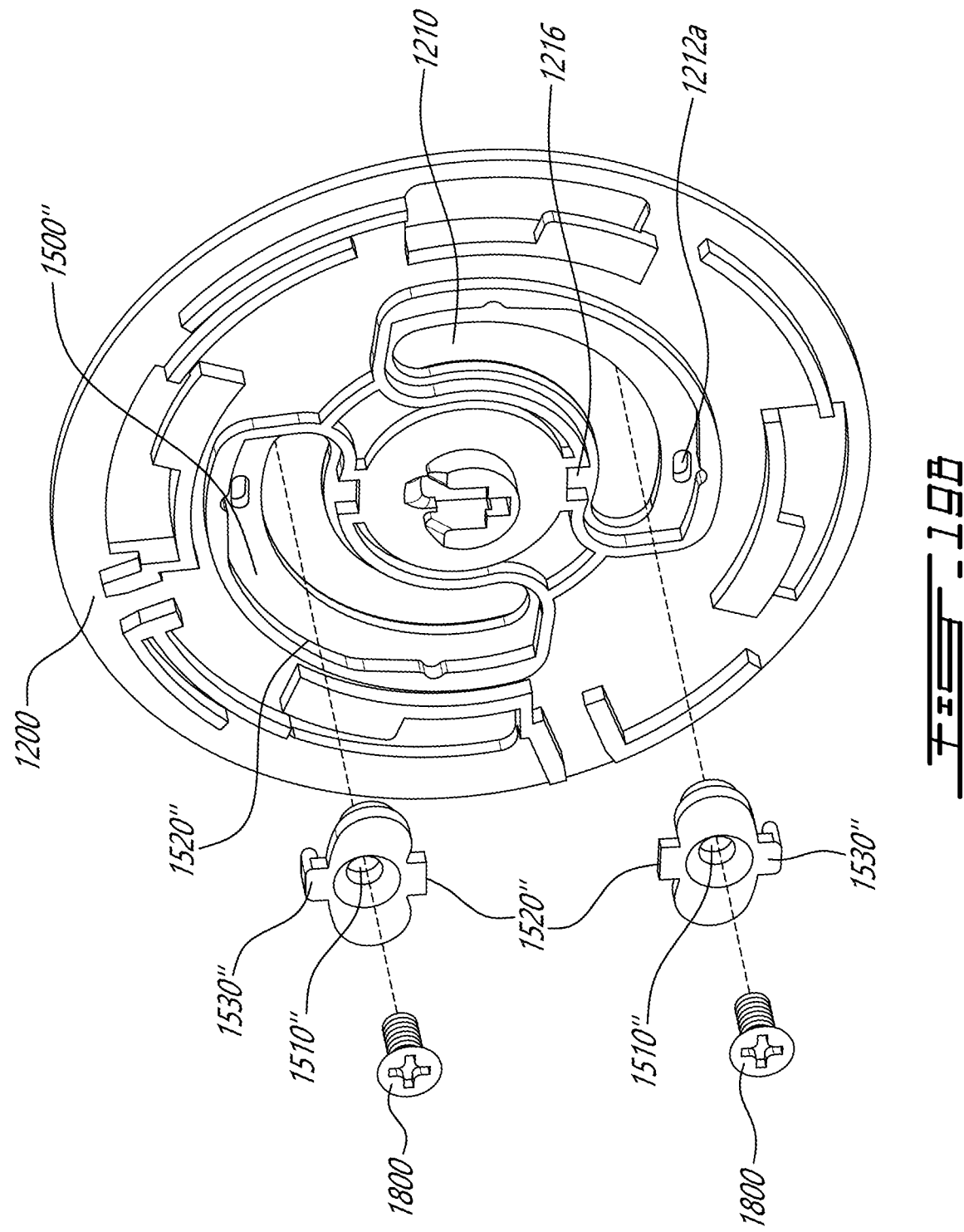

Referring additionally to FIGS. 19A-19B, in various embodiments, for instance for a swingbolt-type locking system, the baseplate 1200 may be non-rotatable relative to the mounting surface. As such, the illustrated lugs 1500" may include protrusions 1520" engageable with slots 1216 and pins or posts 1530" protruding downwardly and engageable with apertures 1212a in the rims 1212. Thus, once the fasteners 1800 are inserted through apertures 1510" to mount the baseplate to the mounting surface, the lugs 1500" prevent rotation of the baseplate 1200 relative to the mounting surface.

Figure 21B:
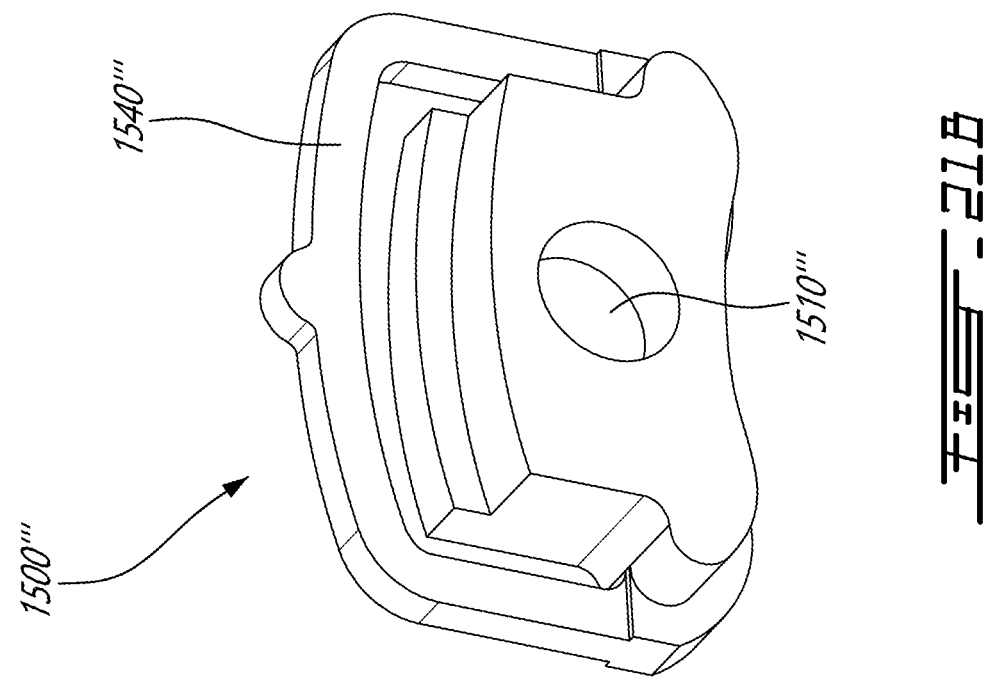
FIGS. 21A and 21B are front and rear perspective views of the exemplary alternate lugs of FIG. 20.
Figure 21A:
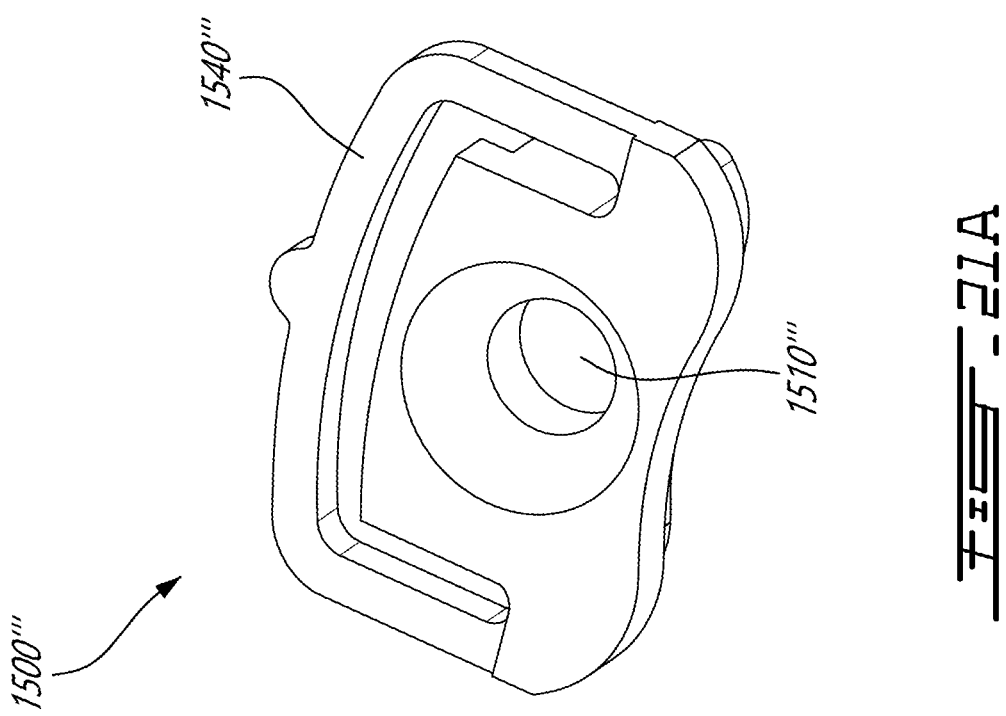

Referring additionally to FIGS. 20-21B, another embodiment of lugs 1500''' with a homing feature is shown. In the depicted embodiment, the length of flexible locking feature 1540''' may reduce strain on the lug 1500''', which may improve its overall long-term performance. The flexible locking feature 1540''' may be operable to engage with detents 1218 in the circumferential track 1210 in the baseplate 1200, acting as a homing feature as the housing 1300 rotates relative to the baseplate 1200, as discussed above.

Referring additionally to FIGS. 22-23, another embodiment of lugs 1500'''' with a homing feature is shown. In the depicted embodiment, each lug 1500'''' includes two cantilevered flexible locking features 1550'''', one operable to engage with a detent 1218 on a radially inner edge of the circumferential track 1210 and one operable to engage with a detent 1218 on a radially outer edge of the circumferential track 1210. Each cantilevered flexible locking feature 1550'''' may be able to endure larger deflections due to its cantilevered nature. The first cantilevered flexible locking feature 1550'''' may provide a torque to counteract the torque endured by the second cantilevered flexible locking feature 1550'''', which may make the motion of the lug 1500'''' through the circumferential track 1210 smoother. Other lug designs may be contemplated as well.

Various materials may be contemplated for the different components used for the attachment systems 100, 1100. The keypad itself 400, 1400 may be made from zinc, while the body of the keypad 400, 1400 may be made from a moulded plastic. The baseplate 200, 1200 may be made from a glass-filled polymer. The locking device 700, 1700 may be made from a moulded plastic. The various types of lugs 500, 1500 may be made from high tensile plastics, while the flexible elements of the lugs may be made from materials other than metals to ensure that they may flex sufficiently. The spindle 900 may be made from metals such as brass or zinc. Other materials for the various components may be contemplated as well.

In some embodiments, there is disclosed an attachment system 100, 1100 for a locking system mounted to a closure, the attachment system 100, 1100 comprising a baseplate 200, 1200 fastenable to a mounting surface of the closure, the baseplate 200, 1200 including a pair of circumferential tracks 210, 1210, each circumferential track 210, 1210 having an arc of approximately ninety degrees, and at least one circumferential cutout 220, 1220 having an engagement feature 222, 1222, and a housing 300, 1300 having at least one protrusion 350, 1350 insertable into the at least one circumferential cutout 220, 1220 and rotatably engageable with the engagement feature 222, 1222 to selectively prevent the housing 300, 1300 from being withdrawn from the baseplate 200, 1200 in a direction normal to the mounting surface, and at least two fasteners, each fastener insertable through a respective one of the circumferential tracks 210, 1210 in the baseplate 200, 1200 for fastening the baseplate 200, 1200 to the mounting surface, the baseplate 200, 1200 fastenable to the mounting surface between a first orientation and a second orientation approximately ninety degrees from the first orientation relative to the direction normal to the mounting surface.

In some embodiments, there is disclosed an attachment system 100, 1100 for a locking system mounted to a closure, the attachment system 100, 1100 comprising a baseplate 200, 1200 fastenable to a mounting surface of the closure, the baseplate 200, 1200 including at least one circumferential track 210, 1210, and at least one circumferential cutout 220, 1220 having an engagement feature 222, 1222, and a housing 300, 1300 having at least one protrusion 350, 1350 insertable into the at least one circumferential cutout 220, 1220 and rotatably engageable with the engagement feature 222, 1222 to selectively prevent the housing 300, 1300 from being withdrawn from the baseplate 200, 1200 in a direction normal to the mounting surface, and at least one fastener insertable through at least one lug 500, 1500 disposed in and circumferentially displaceable through the at least one circumferential track 210, 1210 in the baseplate 200, 1200 for rotatably fastening the baseplate 200, 1200 to the mounting surface.

In some embodiments, there is disclosed an attachment system 100, 1100 for a locking system mounted to a closure, the attachment system 100, 1100 comprising a baseplate 200, 1200 fastenable to a mounting surface of the closure, the baseplate 200, 1200 including at least one circumferential track 210, 1210, and at least one circumferential cutout 220, 1220 having an engagement feature 222, 1222, and a housing 300, 1300 having at least one protrusion 350, 1350 insertable into the at least one circumferential cutout 220, 1220 and rotatably engageable with the engagement feature 222, 1222 to selectively prevent the housing 300, 1300 from being withdrawn from the baseplate 200, 1200 in a direction normal to the mounting surface, and at least one fastener insertable through at least one lug 500, 1500 disposed in the at least one circumferential track 210, 1210 in the baseplate 200, 1200 and engaging with at least one lug-locking feature in the at least one circumferential track 210, 1210 for non-rotatably fastening the baseplate 200, 1200 to the mounting surface.

It can be appreciated from the foregoing that at least some embodiments include an attachment system for a locking system having a baseplate selectively rotatably lockable to a housing and keypad, thereby allowing the keypad to be quickly and easily be disconnected from the baseplate without affecting the stability of the baseplate and maintaining any spindle or cable attachments for the locking system.

It can also be appreciated from the foregoing that at least some embodiments include an attachment system for a locking system having a baseplate with a pair of circumferential tracks, each with an arc of approximately ninety degrees, thereby allowing the baseplate to be mounted to a mounting surface in various orientations so that a housing and keypad can always be installed on the baseplate in a correct and upright orientation.

It can also be appreciated from the foregoing that at least some embodiments include an attachment system for a locking system having a baseplate with at least one circumferential track configured to receive various types of lugs to either mount the baseplate in a rotatable or non-rotatable fashion, thereby allowing the baseplate to be used for a deadbolt, springbolt or swingbolt-type locking system.

As can be seen therefore, the examples described above and illustrated are intended to be exemplary only. The scope is indicated by the appended claims.

What is claimed is:

1. An attachment system for a locking system mounted to a closure, the attachment system comprising:
a baseplate fastenable to a mounting surface of the closure, the baseplate including at least one circumferential cutout having an engagement feature, and a locking feature on a surface of the baseplate;
a housing having at least one protrusion insertable into the at least one circumferential cutout and rotatably engageable with the engagement feature to selectively prevent the housing from being withdrawn from the baseplate in a direction normal to the mounting surface; and
a locking device disposed inside the housing and accessible from outside the housing through a cutout defined in the housing, the locking device operable to rotatably lock and unlock the housing to the baseplate, wherein the baseplate is non-rotatably fastenable to the mounting surface of the closure via at least one fastener insertable through at least one lug disposed in at least one circumferential track in the baseplate and engaging with at least one lug-locking feature in the at least one circumferential track.

2. The attachment system as defined in claim 1, wherein the locking feature on the surface of the baseplate includes an angled ramp and an adjacent catch portion, and the locking device includes a latch-button rotatably engageable with an inner circumferential surface of the angled ramp and lockable in the catch portion to rotatably lock the housing to the baseplate.

3. The attachment system as defined in claim 2, wherein the latch-button includes a spring-loaded button to bias the latch-button into the catch portion.

4. The attachment system as defined in claim 1, wherein the at least one lug includes one or more protrusions or pins and the at least one lug-locking feature includes one or more slots or apertures engageable with the one or more protrusions or pins.

5. The attachment system as defined in claim 1, wherein the baseplate includes a plurality of said locking features.

6. A method for assembling an attachment system for a locking system, comprising:
providing a locking device inside a housing; engaging at least one protrusion projecting from the housing with at least one circumferential cutout of a baseplate to mount the housing to the baseplate;
rotating the housing relative to the baseplate to rotatably engage the at least one protrusion with an engagement feature in the at least one circumferential cutout to selectively prevent the housing from being withdrawn from the baseplate in a direction normal to a mounting surface;
selectively rotatably locking the housing to the baseplate via the locking device, the locking device accessible from outside the housing through a cutout defined in the housing and operable to selectively rotatably unlock the housing from the baseplate; and
non-rotatably fastening the baseplate to the mounting surface by inserting at least one lug in at least one circumferential track in the baseplate, engaging the at least one lug with at least one lug-locking feature in the at least one circumferential track and fastening at least one fastener through the at least one lug to the mounting surface.

7. The method as defined in claim 6, wherein providing the locking device into the housing includes inserting a latch-button into the housing, and wherein rotating the housing relative to the baseplate includes engaging the latch-button with an inner circumferential surface of an angled ramp of a locking feature in the housing and locking the latch-button in a catch portion adjacent the angled ramp to rotatably lock the housing to the baseplate.

8. The method as defined in claim 7, further comprising rotatably unlocking the housing from the baseplate by pressing a spring-loaded button on the latch-button to release the latch-button from the catch portion.

9. An attachment system for a locking system mounted to a closure, the attachment system comprising:
a baseplate fastenable to a mounting surface of the closure, the baseplate including at least one circumferential cutout having an engagement feature, and a locking feature on a surface of the baseplate;
a housing having at least one protrusion insertable into the at least one circumferential cutout and rotatably engageable with the engagement feature to selectively prevent the housing from being withdrawn from the baseplate in a direction normal to the mounting surface; and
a locking device disposed inside the housing and accessible from outside the housing through a cutout defined in the housing, the locking device operable to rotatably lock and unlock the housing to the baseplate, wherein the baseplate is rotatably fastenable to the mounting surface of the closure via at least one fastener insertable through at least one lug disposed in and circumferentially displaceable through at least one circumferential track in the baseplate.

10. The attachment system as defined in claim 9, wherein the locking feature on the surface of the baseplate includes an angled ramp and an adjacent catch portion, and the locking device includes a latch-button rotatably engageable with an inner circumferential surface of the angled ramp and lockable in the catch portion to rotatably lock the housing to the baseplate.

11. The attachment system as defined in claim 10, wherein the latch-button includes a spring-loaded button to bias the latch-button into the catch portion.

12. The attachment system as defined in claim 9, wherein the baseplate includes a plurality of said locking features.

13. A method for assembling an attachment system for a locking system, comprising:
providing a locking device inside a housing; engaging at least one protrusion projecting from the housing with at least one circumferential cutout of a baseplate to mount the housing to the baseplate;
rotating the housing relative to the baseplate to rotatably engage the at least one protrusion with an engagement feature in the at least one circumferential cutout to selectively prevent the housing from being withdrawn from the baseplate in a direction normal to a mounting surface;
selectively rotatably locking the housing to the baseplate via the locking device, the locking device accessible from outside the housing through a cutout defined in the housing and operable to selectively rotatably unlock the housing from the baseplate; and
rotatably fastening the baseplate to the mounting surface by inserting at least one lug in at least one circumferential track in the baseplate and fastening at least one fastener through the at least one lug to the mounting surface, the at least one lug circumferentially displaceable through the at least one circumferential track.

14. The method as defined in claim 13, wherein providing the locking device into the housing includes inserting a latch-button into the housing, and wherein rotating the housing relative to the baseplate includes engaging the latch-button with an inner circumferential surface of an angled ramp of a locking feature in the housing and locking the latch-button in a catch portion adjacent the angled ramp to rotatably lock the housing to the baseplate.

15. The method as defined in claim 14, further comprising rotatably unlocking the housing from the baseplate by pressing a spring-loaded button on the latch-button to release the latch-button from the catch portion.

* * * * *